(12) United States Patent
Moriarty et al.

(10) Patent No.: US 12,054,021 B2
(45) Date of Patent: Aug. 6, 2024

(54) MULTI-INPUT, MULTI-OUTPUT ACTUATOR AND ASSEMBLIES USING SAME

(71) Applicant: Indigo Technologies, Inc., Woburn, MA (US)

(72) Inventors: Thomas Moriarty, Lexington, MA (US); Marco Giovanardi, Melrose, MA (US); Hector A Inirio, Somerville, MA (US); Peter Madden, Reading, MA (US)

(73) Assignee: Indigo Technologies, Inc., Woburn, MA (US)

( * ) Notice: Subject to any disclaimer, the term of this patent is extended or adjusted under 35 U.S.C. 154(b) by 340 days.

(21) Appl. No.: 17/336,895

(22) Filed: Jun. 2, 2021

(65) Prior Publication Data

US 2021/0283970 A1 Sep. 16, 2021

Related U.S. Application Data

(63) Continuation of application No. PCT/US2019/064263, filed on Dec. 3, 2019.
(Continued)

(51) Int. Cl.
*B60G 17/00* (2006.01)
*B60G 15/00* (2006.01)
(Continued)

(52) U.S. Cl.
CPC ........ *B60G 17/0157* (2013.01); *B60G 15/062* (2013.01); *B60G 2202/31* (2013.01);
(Continued)

(58) Field of Classification Search
CPC .............. B60G 17/0157; B60G 15/062; B60G 2202/31; B60G 2202/42; B60G 2202/442;
(Continued)

(56) References Cited

U.S. PATENT DOCUMENTS

| 4,920,295 A | 4/1990 | Holden et al. |
| 5,180,180 A | 1/1993 | Yamashita et al. |

(Continued)

FOREIGN PATENT DOCUMENTS

| CN | 1066027 A1 | 11/1992 |
| CN | 1204593 A | 1/1999 |

(Continued)

OTHER PUBLICATIONS

Extended European Search Report in European Application No. 19893434.1 dated Oct. 11, 2022, 9 pages.
(Continued)

*Primary Examiner* — Yonel Beaulieu
(74) *Attorney, Agent, or Firm* — Smith Baluch LLP

(57) ABSTRACT

An exemplary actuator includes a motor, a transmission, and a support structure. The motor includes two torque sources that apply respective input torques to a rotor, which rotates about a rotation axis in response to a net input torque. The torque sources are arranged such that the input torques are additive, resulting in a vector-summated torque output. The torque sources also generate corresponding reactive torques that are applied to the first stator and the second stator. The transmission couples and constrains the first stator and the second stator such that rotational motion of one stator causes counter rotation of the other stator. Thus, the reactive torques are subtractive resulting a differential torque output. In some applications, the differential torque output is used to actuate a suspension of a vehicle. The actuator is also coupled to the vehicle via the support structure, which also reflects a reaction force or torque to actuate other subsystems (e.g., anti-dive, anti-squat).

20 Claims, 36 Drawing Sheets

Related U.S. Application Data

(60) Provisional application No. 62/862,786, filed on Jun. 18, 2019, provisional application No. 62/774,813, filed on Dec. 3, 2018.

(51) Int. Cl.
  *B60G 15/06* (2006.01)
  *B60G 17/015* (2006.01)

(52) U.S. Cl.
  CPC .... *B60G 2202/42* (2013.01); *B60G 2202/442* (2013.01); *B60G 2204/419* (2013.01); *B60G 2500/22* (2013.01); *B60G 2800/014* (2013.01)

(58) Field of Classification Search
  CPC .......... B60G 2204/419; B60G 2500/22; B60G 2800/014; B60G 2200/10; B60G 2204/182; B60G 2300/50; B60G 3/01; B60G 17/021; B60G 2202/44; B60G 2500/30; B60K 2007/0053; B60K 2007/0061; B60K 7/0007; Y02E 10/72; H02K 16/04; H02K 1/02; H02K 7/00; H02K 7/006; H02K 7/07; H02K 7/08; H02K 7/083; H02K 7/14; F16H 1/16
  See application file for complete search history.

(56) References Cited

U.S. PATENT DOCUMENTS

| | | | |
|---|---|---|---|
| 6,194,802 B1 | 2/2001 | Rao | |
| 6,201,329 B1 | 3/2001 | Chen | |
| 8,362,660 B2 | 1/2013 | Hunter | |
| 8,519,575 B2 | 8/2013 | Hunter et al. | |
| 8,585,062 B2 | 11/2013 | Hunter | |
| 8,624,699 B2 | 1/2014 | Hunter et al. | |
| 8,742,633 B2 | 6/2014 | Hunter et al. | |
| 8,766,493 B2 | 7/2014 | Hunter et al. | |
| 9,172,287 B2 | 10/2015 | Fofonoff et al. | |
| 9,231,462 B2 | 1/2016 | Hunter et al. | |
| 9,473,009 B2 | 10/2016 | Hunter et al. | |
| 9,559,564 B1 | 1/2017 | Dhyllon | |
| 9,810,552 B2 | 11/2017 | Hunter et al. | |
| 9,843,249 B2 | 12/2017 | Hunter et al. | |
| 9,934,904 B2 | 4/2018 | Hunter et al. | |
| 10,476,360 B2 | 11/2019 | Hunter et al. | |
| 10,483,832 B2 | 11/2019 | Hunter et al. | |
| 10,644,578 B2 | 5/2020 | Hunter et al. | |
| 10,742,083 B2 | 8/2020 | Hunter et al. | |
| 10,763,713 B2 | 9/2020 | Carlson et al. | |
| 10,938,285 B2 | 3/2021 | Hunter et al. | |
| 11,218,063 B2 * | 1/2022 | Crecelius | B60K 6/26 |
| 11,368,076 B2 | 6/2022 | Hunter et al. | |
| 2002/0125086 A1 | 9/2002 | Oliver et al. | |
| 2004/0263099 A1 * | 12/2004 | Maslov | B60L 50/20 |
| | | | 318/400.24 |
| 2009/0251021 A1 | 10/2009 | Atarashi et al. | |
| 2012/0032619 A1 * | 2/2012 | Kobayashi | B06B 1/045 |
| | | | 318/128 |
| 2012/0129639 A1 | 5/2012 | Novikov | |
| 2012/0227389 A1 * | 9/2012 | Hinderks | F02B 75/002 |
| | | | 60/317 |
| 2014/0285045 A1 | 9/2014 | Obata et al. | |
| 2016/0111987 A1 | 4/2016 | Hunter et al. | |
| 2016/0380523 A1 | 12/2016 | Hunter et al. | |
| 2018/0072120 A1 | 3/2018 | Hunter et al. | |
| 2018/0226188 A1 | 8/2018 | Hunter et al. | |
| 2020/0217404 A1 * | 7/2020 | Mellet | F16H 45/02 |
| 2021/0044165 A1 | 2/2021 | Carlson et al. | |
| 2021/0135511 A1 * | 5/2021 | Gaither | H02K 7/14 |
| 2021/0167675 A1 | 6/2021 | Hunter et al. | |
| 2021/0194302 A1 | 6/2021 | Purchase et al. | |
| 2023/0249714 A1 * | 8/2023 | Shono | B60W 10/20 |
| | | | 701/23 |

FOREIGN PATENT DOCUMENTS

| | | | | |
|---|---|---|---|---|
| EP | 3035506 A1 * | 6/2016 | .......... | B62D 5/0403 |
| EP | 3129249 B1 | 10/2018 | | |
| WO | WO-2009086135 A2 * | 7/2009 | .............. | B60K 6/26 |
| WO | 2009138226 A2 | 11/2009 | | |
| WO | WO-2012120525 A1 * | 9/2012 | .............. | B60K 6/48 |
| WO | 2015155670 A1 | 10/2015 | | |
| WO | 2018071044 A1 | 4/2018 | | |

OTHER PUBLICATIONS

International Search Report and Written Opinion in International Patent Application No. PCT/US2019/064263 mailed Feb. 18, 2020, 20 pages.

First Office Action with translation in Chinese App. No. 201980080200.3 dated Nov. 28, 2023, 24 pages.

Japanese Office Action with translation in Japanese App. No. 2021-531244 dated Oct. 30, 2023, 12 pages.

Office Action with translation in Korean App. No. 10-2021-7017111 dated May 21, 2024, 8 pages.

* cited by examiner

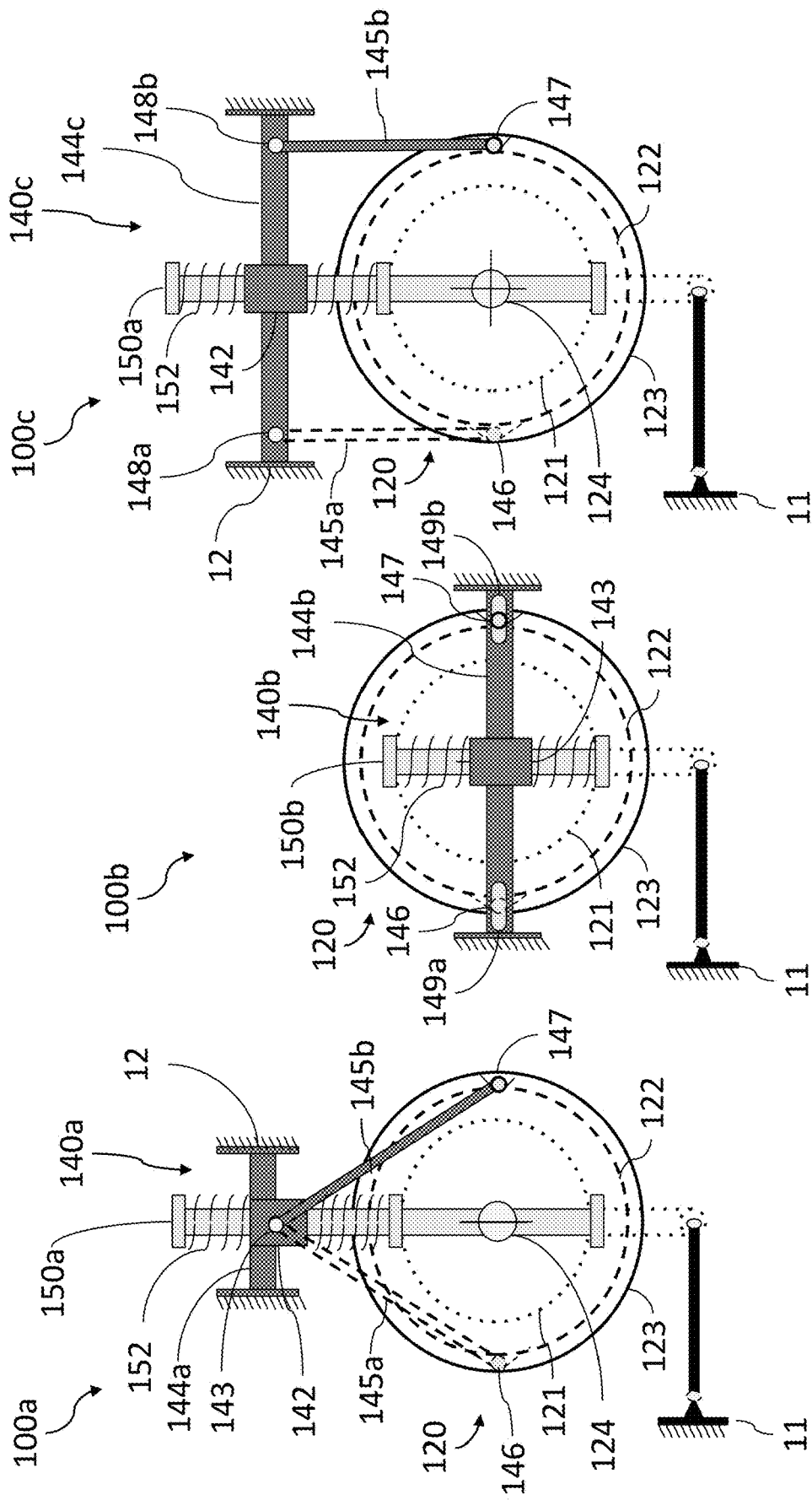

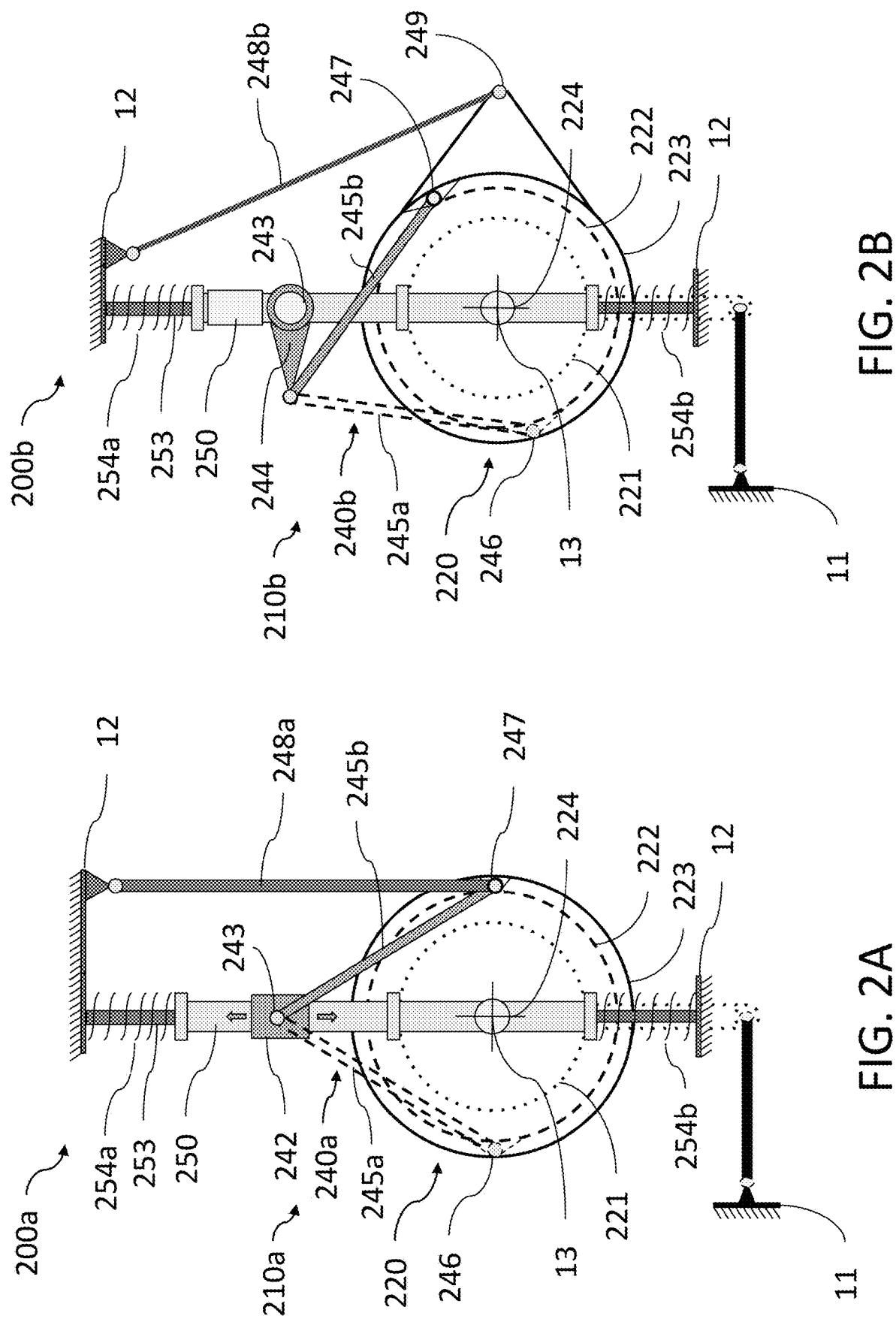

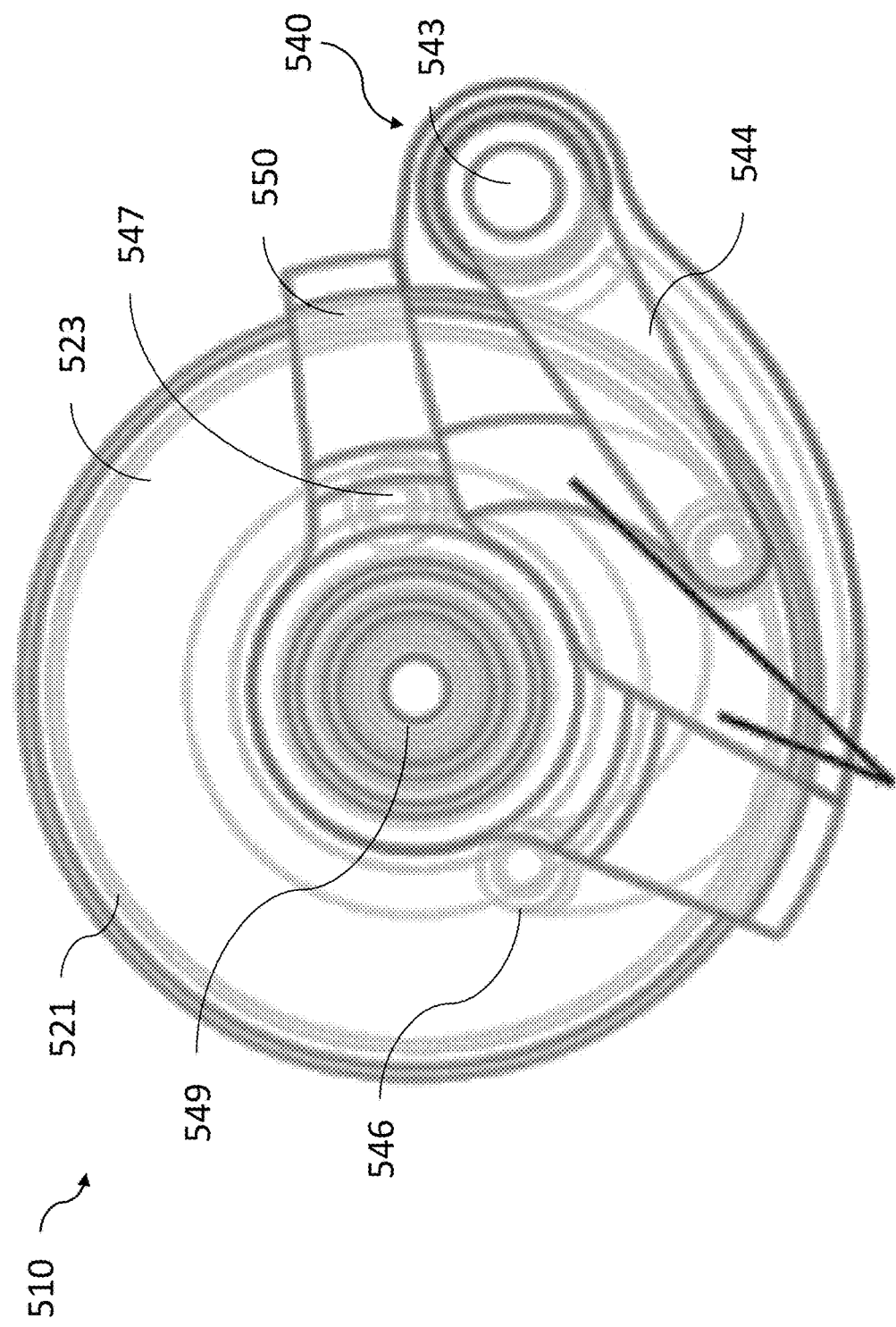

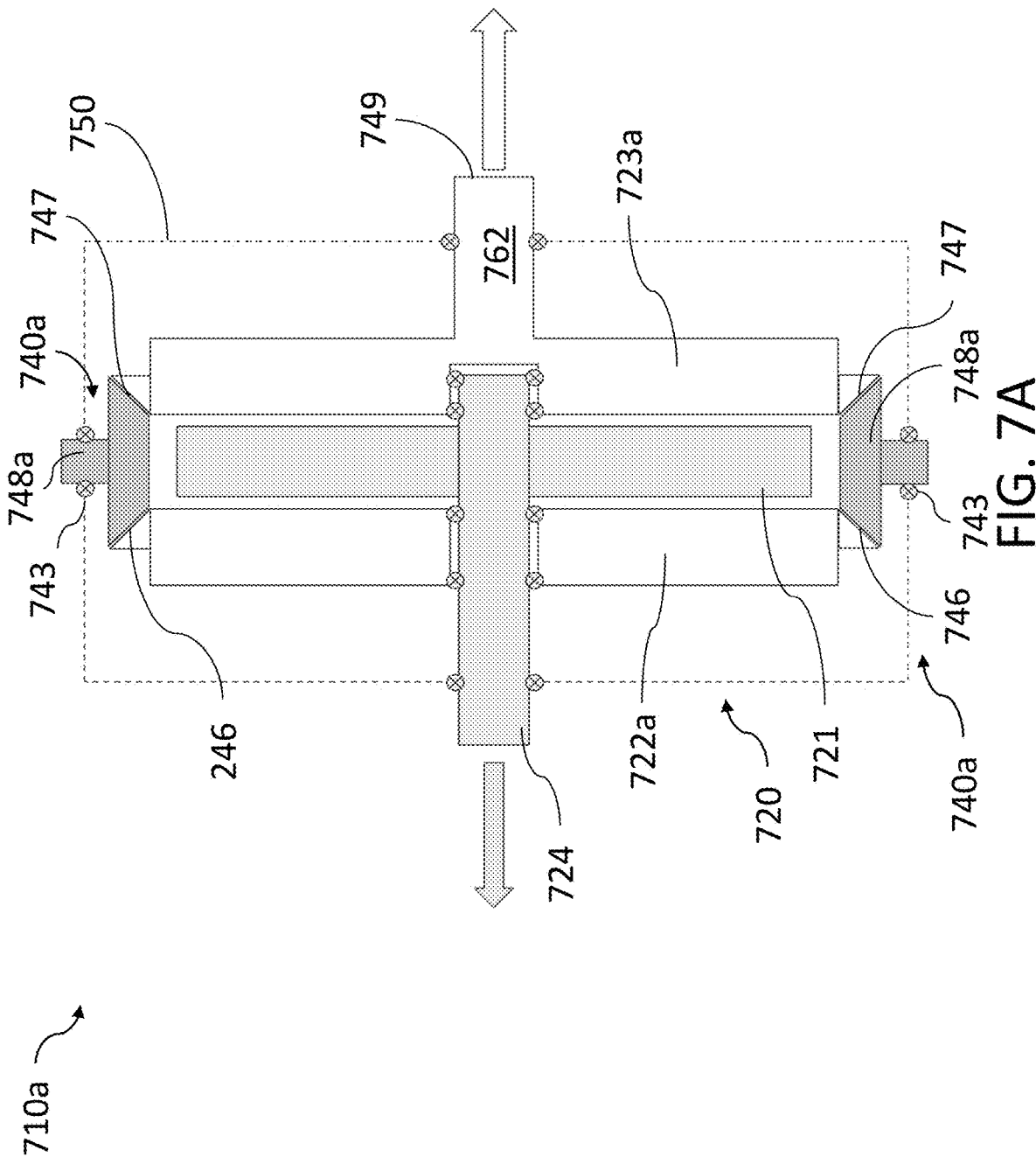

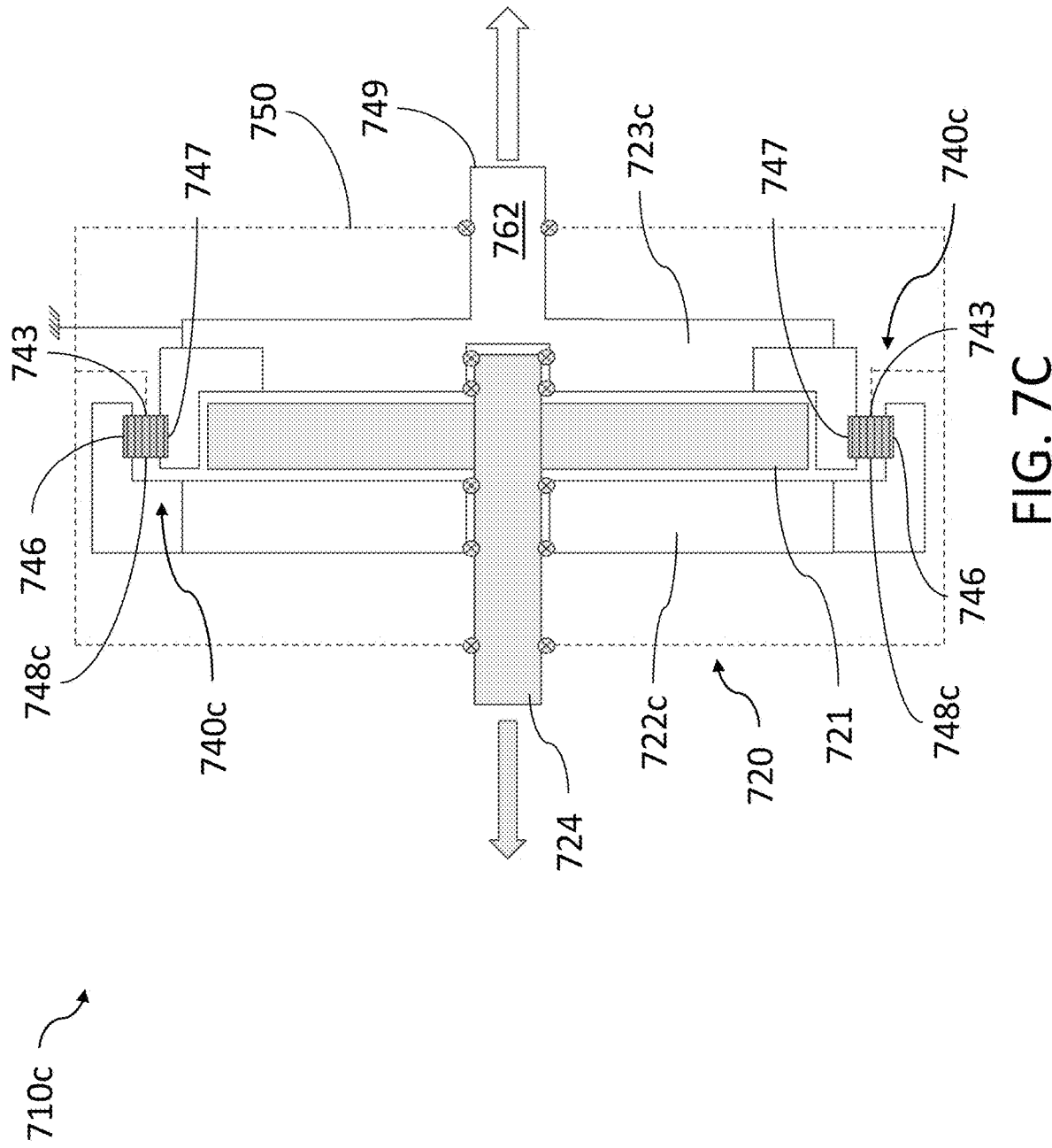

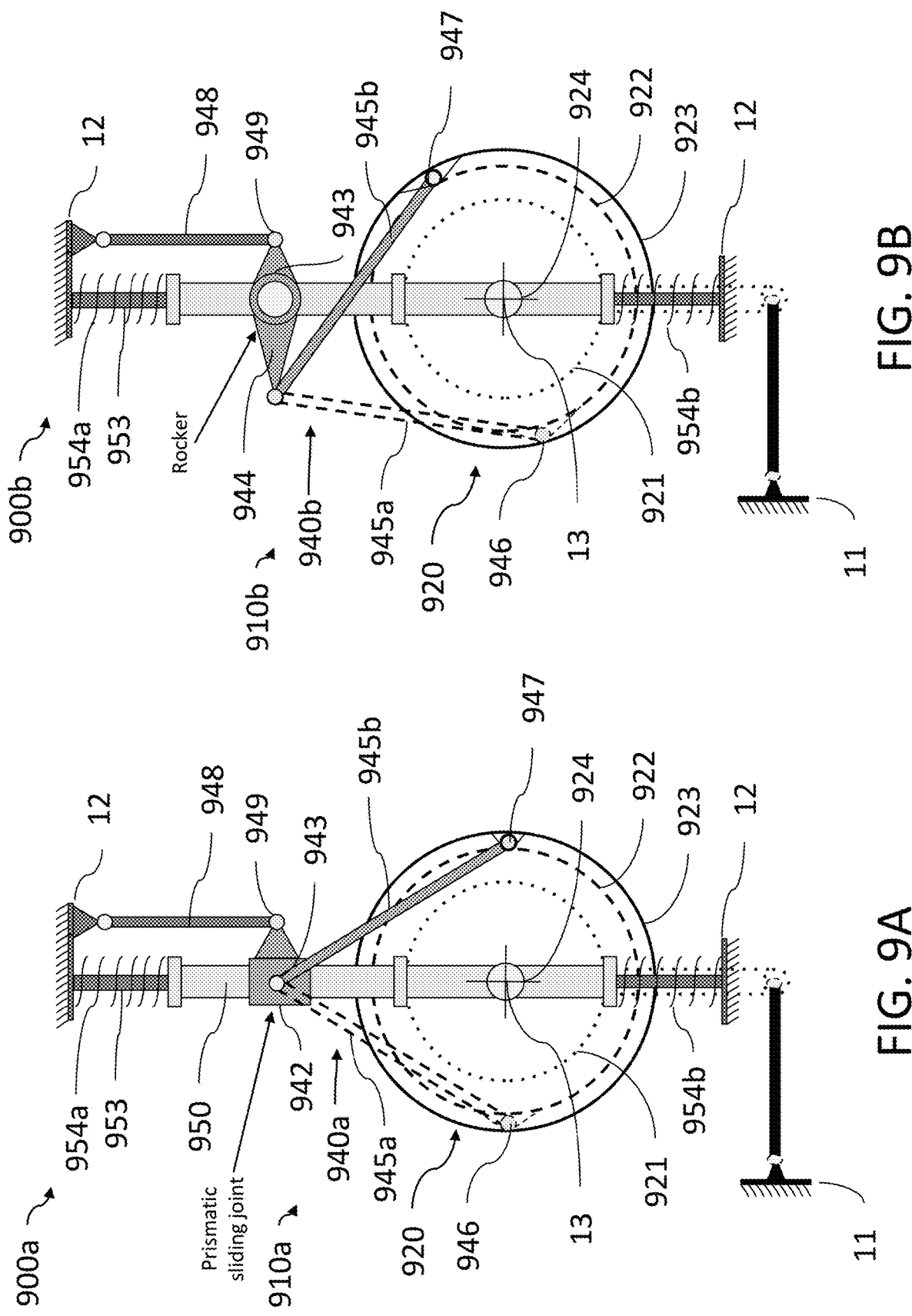

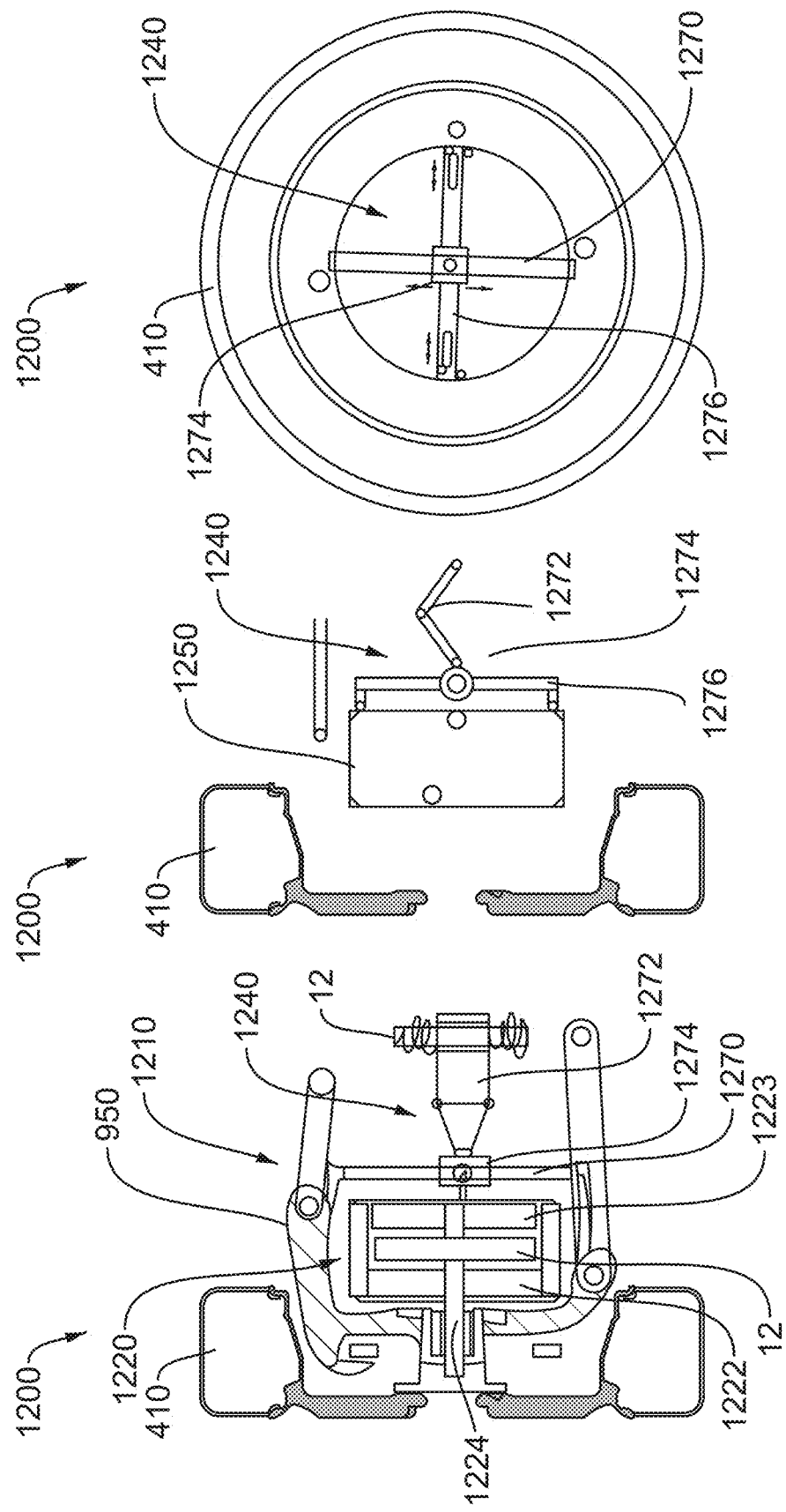

MULTI-INPUT, MULTI-OUTPUT ACTUATOR AND ASSEMBLIES USING SAME

CROSS-REFERENCE TO RELATED APPLICATIONS

This application is a bypass continuation of International Application No. PCT/US2019/064263, filed on Dec. 3, 2019, and entitled "A Multi-Input, Multi-Output Actuator and Assemblies Using Same," which claims the priority benefit, under 35 U.S.C. 119(e), of U.S. Application No. 62/862,786, filed on Jun. 18, 2019, and entitled "A Multi-Input, Multi-Output Actuator" and of U.S. Application No. 62/774,813, filed on Dec. 3, 2018, and entitled "A Multi-Input, Multi-Output Actuator." Each of these applications is incorporated herein by reference in its entirety for all purposes.

BACKGROUND

Electric motors are used to convert electricity into a mechanical force and/or motion in home appliances, power tools, and automotive vehicles. The cost of a typical electric motor depends primarily on the cost of the raw materials used for its manufacture. For example, the rare earth magnets and copper used in the coils of an electric motor are typically the largest contributors to the overall cost of the motor. In order to reduce the cost of a mechanical system, it is often desirable to use a single motor to power multiple subsystems.

One common approach to driving many subsystems with one motor is to use gears and/or switches to control which subsystem is driven by the motor. For example, a gearbox coupled to a motor may have multiple gears, where the output of each gear is coupled to a different subsystem. In this manner, a single motor may drive two or more subsystems, albeit often with the constraint that the subsystems are not used concurrently if gearbox can channel power to only one function at a time.

FIGS. 1A-1C shows kinematically equivalent actuator assemblies 100a-100c that can be used to perform two functions in a wheeled vehicle simultaneously: propulsion and active suspension. The actuator assembly 100a in FIG. 1A includes an axial flux motor 120 coupled to a support structure 150. The axial flux motor 120 includes a rotor 121 mounted to a spindle 124. The rotor 121 rotates in response to torque inputs applied by torque sources on a first stator 122 and a second stator 123. The spindle 124 is coupled to a reference ground 11 (e.g., via a wheel that touches a road). The spindle 124 is further coupled to a support structure 150. The support structure 150 is coupled directly to a chassis 12, which includes a joint housing 142 mounted on an arm 144a. The joint housing 142 is slidably adjustable with respect to the support structure 150. Additionally, a spring 152 is coupled to the joint housing 142 and the support structure 150 to provide a restoring force as a suspension.

The first stator 122 is coupled to the joint housing 142 via a link 145a at node 146 and the second stator 123 is coupled to the joint housing 142 via a link 145b at node 147. The links 145a and 145b couple to the joint housing 142 at node 143. To actuate the suspension, a reactive torque is applied to the first stator 122 and/or the second stator 123. This, in turn, results in a force exerted onto the chassis 12 that causes the motor 120 to translate relative to the chassis 12 along the support structure 150 (e.g., move up and down in FIG. 1A).

FIG. 1B shows another actuator assembly 100b that both propels and provides active suspension for a vehicle. Again, the chassis 12 is directly coupled to the axial flux motor 120 via slots 149a and 149b in an arm 144b. The slots 149a and 149b couple to pins mounted to the first stator 122 at node 146 and the second stator 123 at node 147.

FIG. 1C shows another actuator assembly 100c that provides propulsion and active suspension. The chassis 12 includes an arm 144c that couples to links 145a and 145b at nodes 148a and 148b, respectively, instead of to the joint housing 142. The links 145a and 145b are coupled to the first stator 122 and second stator 123, respectively, at nodes 146 and 147 as in FIG. 1A.

SUMMARY

The actuator assemblies 100a-100c in FIGS. 1A-1C (collectively, actuator assemblies 100) can rotate a rotor 121 and translate a suspension. The actuator assemblies 100 are used primarily for their simplicity in integration since the output of the motor 120 is directly coupled to the chassis 12. However, these actuator assemblies 100 suffer from several deficiencies. First, the actuator assemblies 100 cannot reflect forces/torques between the support structure 150 and the chassis 12 since the reactive torques applied to the first stator 122 and the second stator 123 are dissipated by the chassis 12. In other words, the support structure constrains the translational motion of the spindle 124 in relation to the chassis. Neither the first stator 122 nor the second stator 123 imparts a torque load to the support structure in the actuator assemblies 100 shown in FIGS. 1A-1C.

This prevents the actuator assemblies 100 from providing additional outputs. Second, the actuator assemblies 100 are not self-contained mechanisms; they rely on the integration with the chassis 12 to provide the desired actuation. This, in turn, means that the chassis 12 should have certain structural features to enable the actuator assemblies 100 to operate properly.

The present disclosure is thus directed to actuators that can reflect forces/torques and/or are compatible with a wide variety of chassis or other reference structures. An example actuator may include a motor, a transmission, and a support structure (suspension). The motor may include one or more torque sources to provide input torques for actuation. The transmission may couple and constrain the torque sources in order to modify the resulting output forces/torques provided by the actuator. For example, the actuator may provide a summated torque output based on the superposition of the one or more input torques. The transmission, in turn, may couple and constrain the torque sources in order to produce counter rotating motion. In this manner, the actuator may also provide a differential torque output based on the subtraction of the one or more input torques.

The output forces/torques from the actuator may be further divided into various component forces/torques that are applied at one or more nodes connecting the actuator to other subsystems. For example, the output forces/torques may include reflected forces/torques applied between the support structure of the actuator and a chassis that arise in response to an imbalance in forces/torques from the other outputs of the actuator. The reflected forces/torques may provide yet another output to actuate a subsystem. For example, the reflected forces/torques may be used for anti-dive and/or anti-squat functions in a suspension (e.g., preventing the front of the vehicle from moving downwards during forward deceleration and/or the rear of the vehicle from moving downwards during forward acceleration).

Additionally, the actuator may provide a mixture of outputs of varying magnitude and/or direction based on the one or more input torques and/or reactive torques. For example, the transmission may constrain the range of motion and/or the motion ratio of the one or more torque sources, thus changing the dependence of each output force/torque on the input torques/reactive torques. The actuator may also incorporate mechanisms that create asymmetric responses between the inputs (e.g., a first torque source moves a second torque source, but the second torque source is unable to move the first torque source).

In one exemplary application, the actuator may be used as part of an active suspension system of a vehicle. The actuator may be part of an actuator assembly that includes a chassis coupled to the actuator via a MacPherson strut and a wheel coupled to the motor in the actuator. The wheel is unsprung mass and the chassis is sprung mass. The actuator may include a rocker joint mechanism or a sliding joint mechanism that couples the motor and/or the transmission directly to the chassis via a component that is capable of moving the sprung mass relative to the unsprung mass.

In one example, an actuator for a vehicle includes a support structure connected to a chassis of the vehicle via a suspension, a transmission coupled to the support structure, and a motor coupled to the support structure and the transmission. The motor includes a rotor that rotates about a rotation axis, a first stator concentric with the rotation axis, and a second stator concentric with the rotation axis. The first stator applies a first torque to the rotor and to the suspension via the transmission. The second stator applies a second torque to the rotor and to the suspension and/or the chassis.

In another example, an actuator assembly for a vehicle includes an axial flux motor with a support structure, a spindle defining a rotation axis and extending through an opening in the housing, a rotor fixed to the spindle, a first stator concentric with the rotation axis, and a second stator concentric with the rotation axis. The actuator assembly also includes a suspension rigidly connected to the support structure and compressibly coupled to a chassis of the vehicle, a torsion bar rotatably coupled to the suspension and rotatably coupled to the first stator and the second stator, and a tension-compression member rotatably coupled to the second stator and rotatably coupled to the chassis.

In one example, a method of actuating at least one of a rotor or a suspension of a vehicle includes the following steps: (1) applying a first torque to the rotor where the rotor is configured to rotate about a rotation axis, (2) while applying the first torque, applying a second torque to the rotor, (3) in response to applying the first torque, applying a first reactive torque to a first stator configured to rotate about the rotation axis, (4) in response to applying the second torque, applying a second reactive torque to a second stator configured to rotate about the rotation axis where the second stator being coupled to the first stator via a transmission, (5) transferring at least a portion of the first reactive torque from the first stator to the suspension via the transmission, and (6) transferring at least a portion of the second reactive torque from the second stator to at least one of the suspension or a chassis of the vehicle where the chassis being coupled to the suspension.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a first actuator assembly that provides vehicle propulsion and active suspension.

FIG. 1B shows a second actuator assembly that provides vehicle propulsion and active suspension.

FIG. 1C shows a third actuator assembly that provides vehicle propulsion and active suspension.

FIG. 2A shows an exemplary actuator assembly with a stator directly coupled to the chassis.

FIG. 2B shows another exemplary actuator assembly with a stator directly coupled to the chassis.

FIG. 5D shows an inboard view of the actuator of FIG. 5A.

FIG. 7A shows a cross-sectional schematic of an exemplary actuator with a bevel gear transmission.

FIG. 7C shows a cross-sectional schematic of an exemplary actuator with a planetary gear transmission.

FIG. 9A shows an exemplary actuator assembly with a transmission directly coupled to a chassis via a prismatic sliding joint.

FIG. 9B shows another exemplary actuator assembly with a transmission directly coupled to a chassis via a rocker joint.

FIG. 12A shows a front view of an exemplary actuator assembly that includes an actuator with a linkage-based transmission.

FIG. 12B shows a top view of the actuator of FIG. 12A.

FIG. 12C shows an inboard view of the actuator of FIG. 12A.

DETAILED DESCRIPTION

Figure 3A:
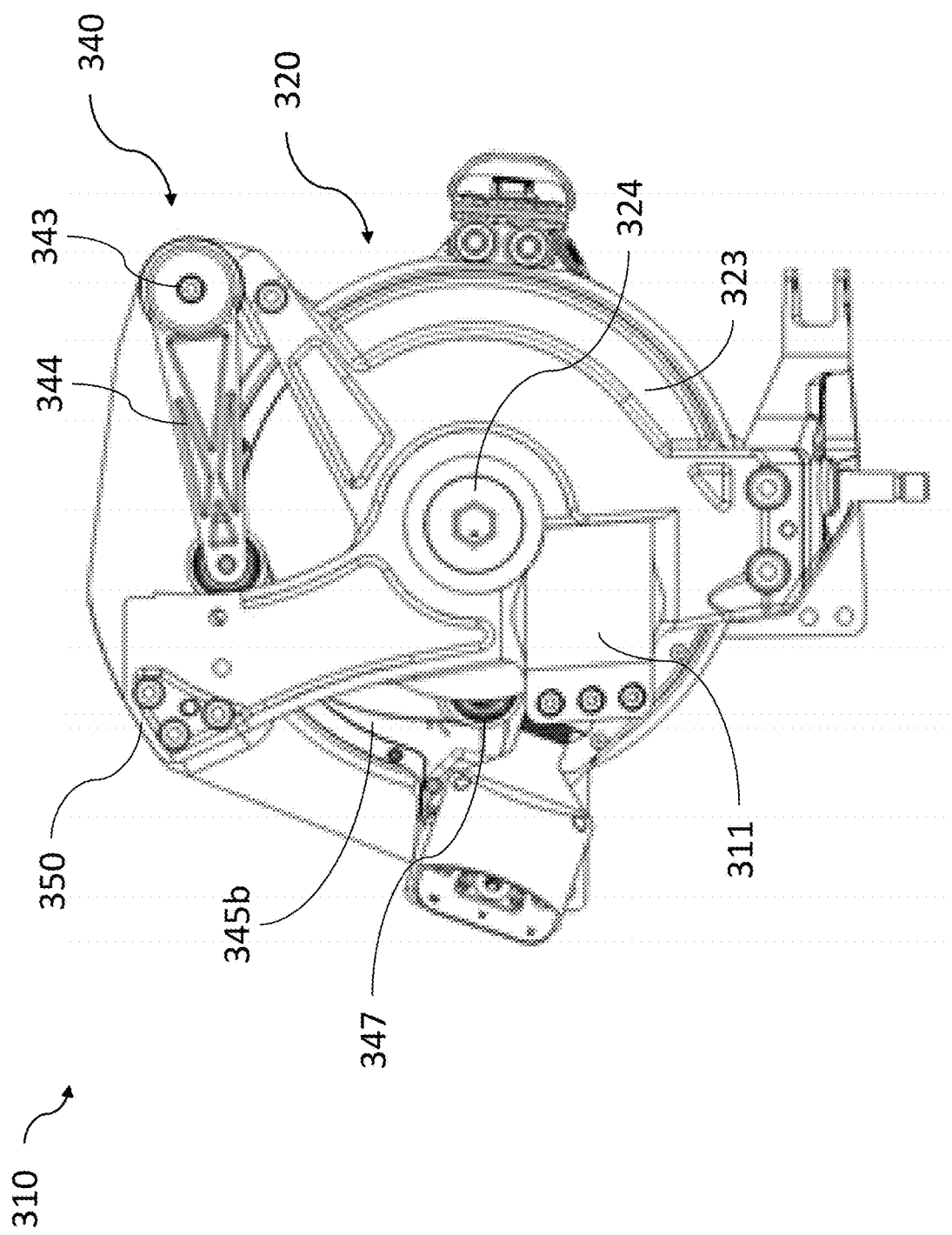
FIG. 3A shows an inboard view of an exemplary actuator with an axial flux motor.
Figure 3B:
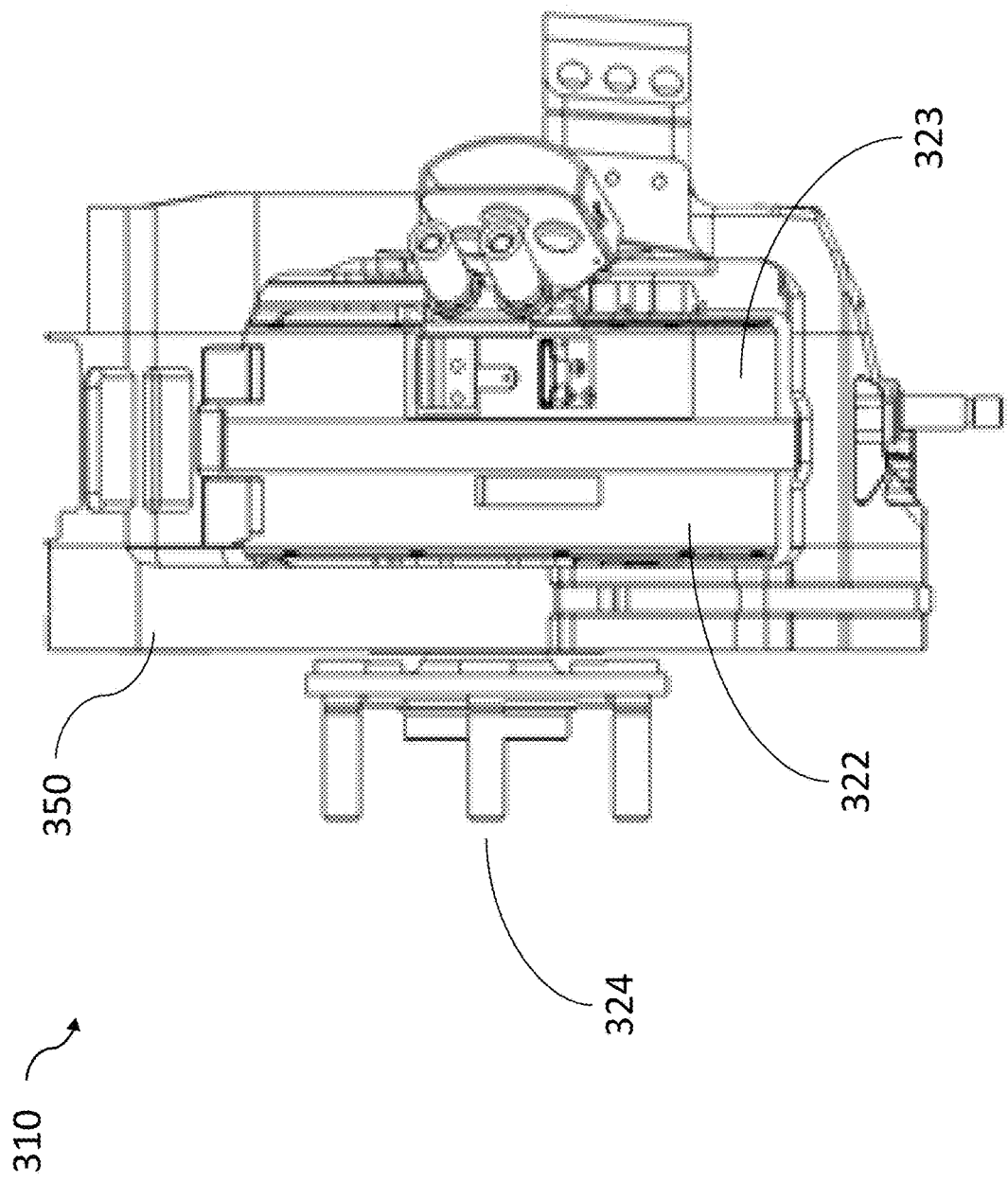
FIG. 3B shows a rear view of the actuator of FIG. 3A.
Figure 3C:
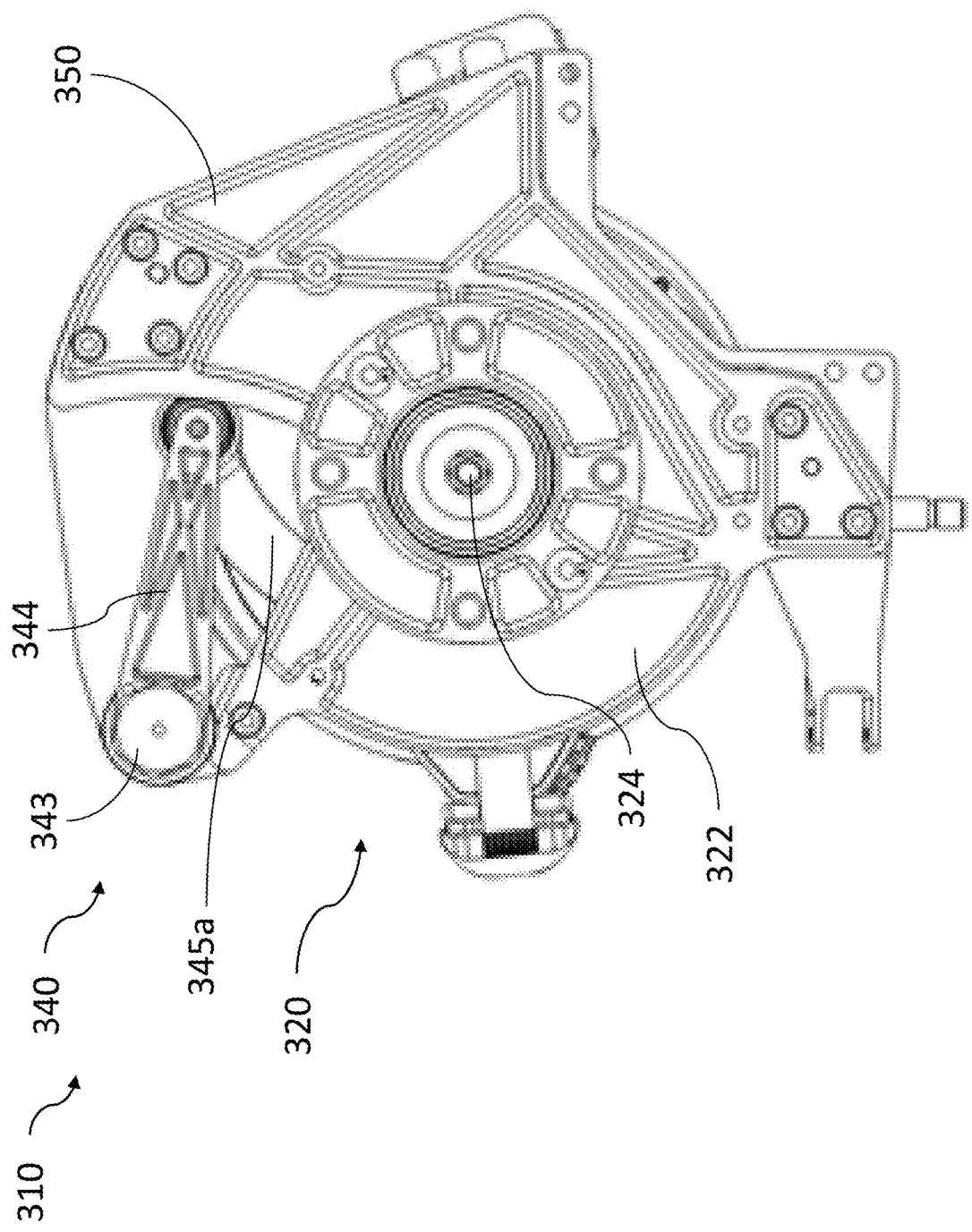
FIG. 3C shows an outboard view of the actuator of FIG. 3A.
Figure 3D:
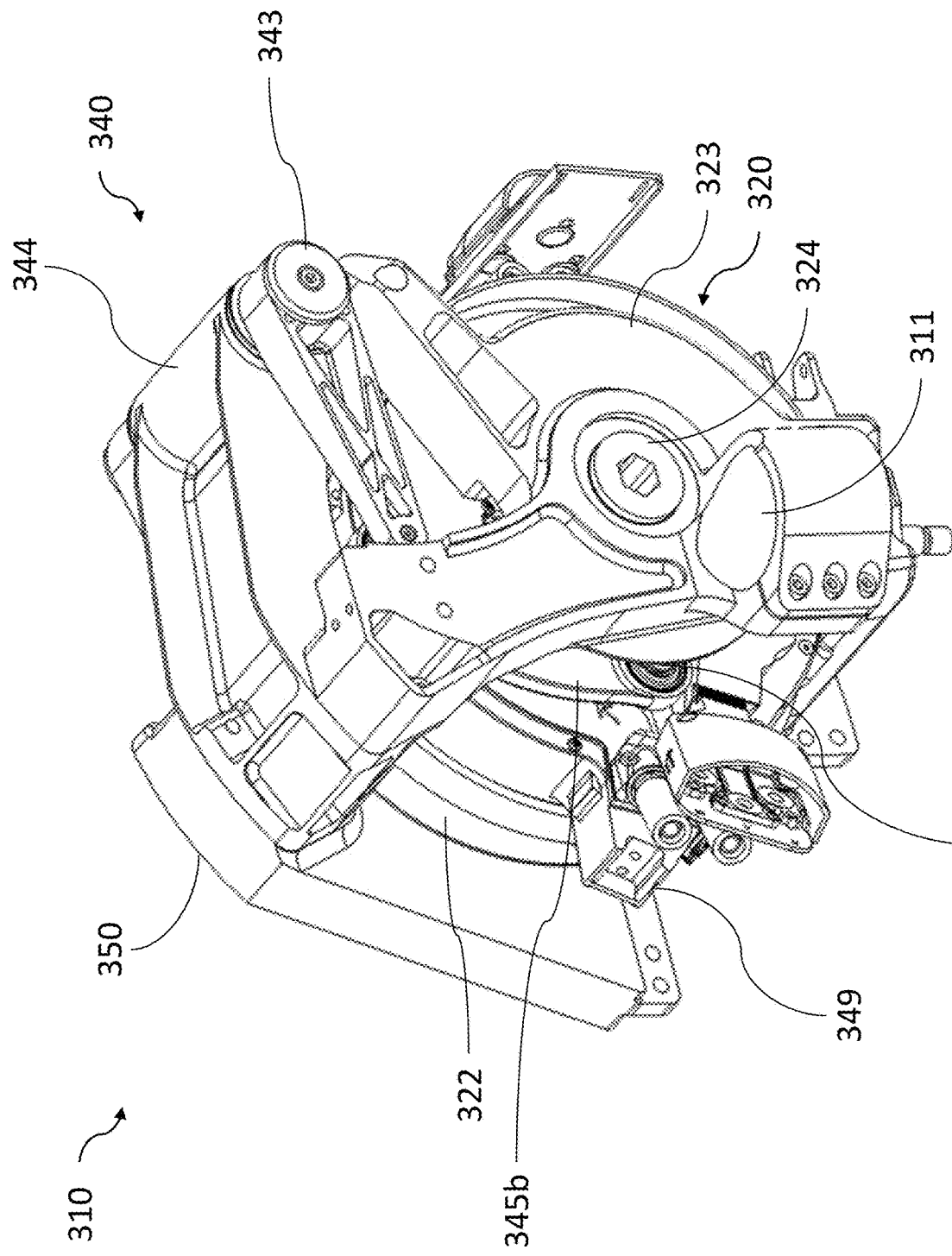
FIG. 3D shows a perspective view of the actuator of FIG. 3A.

Following below are more detailed descriptions of various concepts related to, and implementations of, an actuator (e.g., an assembly of a motor, a transmission, and a support structure) that provides one or more outputs (e.g., a force, a torque) for various subsystems. Specifically, various aspects related to a transmission, a motor, the coupling between a transmission, a support, a motor, and/or a reference structure, and actuator assemblies integrating the actuator are described herein. The concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive actuators are provided, wherein a given example or set of examples showcases one or more particular features of a motor (e.g., a rotor, a stator), a support structure, and a transmission (e.g., a torsion bar, a linkage, a planetary gear, a bevel gear, a belt, a pulley, a gear train, a track drive system). Features discussed in connection with a given example of an actuator including the motor, housing, and transmission may be employed in other examples of actuators according to the present disclosure, such that the various features disclosed herein may be readily combined in a given system according to the present disclosure (provided that these features are not incompatible with each other).

In general, the actuator can actuate one or more subsystems based on one or more force/torque inputs. Depending on how the actuator is coupled to the other components in the actuator assembly, the outputs of the actuator may be applied selectively (e.g., only one output is applied at a time) or simultaneously (e.g., one or more outputs are applied at the same time).

In some exemplary embodiments, the actuator may include two torque sources that each apply a torque input to move a first component (e.g., rotate a rotor). For each torque input, a reactive torque may be applied to a second component (e.g., a first stator) and a third component (e.g., a second stator) supporting the respective torque sources. The reactive torques may have the same magnitude as the torque input but applied in a substantially opposite direction. Thus, the first, second, and third components may generally move relative to each other. For example, the first, second, and third components may each be constrained to rotate about a common axis, thus the respective components may rotate relative to each other. The first, second, and third components may also be constrained by other mechanical loads. Thus, the components may transfer a force or torque instead of moving. In this manner, the actuator may provide multiple output forces/torques.

Furthermore, each output force/torque may be divided into additional outputs (e.g., a force may be divided into two respective force components that are each used as different, albeit coupled outputs). For example, the actuator may be coupled to a chassis at two different nodes. At one node, the force exerted by the actuator onto the chassis may cause the actuator to translate vertically (e.g., an active suspension). At the other node, the force exerted between the actuator and chassis may prevent, reduce, or resist unwanted horizontal translational motion.

The actuators disclosed herein may include an electric motor, such as an axial flux motor, radial flux motor, or radial-axial flux motor, with at least two torque sources (e.g., brushless direct current (DC) torque sources) of substantially equal size and output power. In an axial flux motor, each torque source can be mounted to a corresponding stator, which may rotate in response to applied reactive torques. The two stators may share a rotor, which contains permanent magnets that respond to magnetic fields generated by coils on the respective stators. The use of a single rotor with two stators may provide additional efficiencies to the overall operation of the actuator. However, the motor may include more than one rotor (e.g., it may include at least one rotor per stator).

Furthermore, while the exemplary embodiments described below relate to an actuator integrated into an actuator assembly that rotates a rotor and/or actuates a suspension (e.g., on a vehicle), an inventive actuator may be used in other applications as well. For example, the actuator may provide other outputs for vehicle operation including, but not limited to ride height adjustment, steering, suspension tuning adjustment, and/or anti-dive/anti-squat. The actuator may also be used to operate other dynamic systems in the vehicle that involve two modes of operation, such as seat adjustment. The actuator may be coupled to a chassis using various types of suspensions including, but not limited to a MacPherson strut, a torque connection to the chassis through a linkage similar to a roll stabilizer, or any other suspension suitable for converting rotary motion to linear motion.

The benefits of having a single actuator capable of actuating two or more degrees of freedom may also find application in other technologies where space, material, and/or allowable mass are limited. Such applications include, but are not limited to electric propellers with outboard steering for aquatic vehicles, thrust vectoring in jet propulsion systems, multi-degree of freedom actuation systems for aircraft wings, controllable pitch propeller drives, actuation of various onboard satellite subsystems (e.g., on a cube satellite), rotational platforms with additional degrees of operation (e.g., active camera stability, adjustment), stability control of optical systems, actuation of directional and rotating components for medical tooling and devices, drilling components, energy harvesting from multiple motion energy domains, and compact azimuthal control of wind turbines.

For example, the actuator may be used to regulate the ride height of a vehicle while providing traction, either as an in-wheel motor or mounted inboard on the sprung mass or chassis of the vehicle. In this case, the actuator may be mounted on one corner of a road vehicle where one of the outputs of the actuator is coupled to either the wheel or a drive shaft rotatably connected to the wheel. A second output may be coupled to a height-adjustment mechanism that controls the ride height of the vehicle. Each wheel may have a corresponding actuator and a height-adjustment mechanism. The height-adjustment mechanism may include a lead screw or ball screw that, when actuated, moves one end of a spring coupling the sprung and unsprung mass of the vehicle (e.g., the main suspension spring or roll stabilizer). Another height-adjustment mechanism may include a gear or set of gears coupled to a torsional spring disposed between the sprung and unsprung mass. In another embodiment, a mechanism may translate the motion of the output shaft to a piston, thus creating pressure on a load carrying mechanism such as an airbag or a hydraulic cylinder.

An Actuator with a Stator Coupled Directly to a Chassis

FIG. 2A shows one example of an actuator assembly 200a with a sliding joint transmission and a stator directly coupled to a chassis 12. As shown, the actuator assembly 200a includes an actuator 210a with a motor 220, a transmission 240a, and a support structure 250. The motor 220 includes a rotor 221 that mounts to a spindle 224, which defines a rotation axis 13. The spindle 224 may be mechanically coupled to a reference ground 11 (e.g., a wheel that is fixed to the spindle 224 and contacts a road). The motor 220 further includes a first stator 222 and a second stator 223 each supporting a torque source (not shown) that applies an input torque to the rotor 221. The first stator 222 and second stator 223 may be mounted coaxially with the spindle 224 via one or more bearings. Thus, the first stator 222 and second stator 223 may rotate relative to the spindle 224. The spindle 224 may be further coupled to the support structure 250 (e.g., a strut housing of a MacPherson strut). The support structure 250 may be slidably adjustable along a strut 253, which is rigidly coupled to the chassis 12. In some cases, the support structure 250 and the strut 253 may form a prismatic sliding joint. The actuator assembly 200a may further include springs 254a and 254b to provide a restoring force that maintains the support structure 250 at a particular position along the strut 253 when the actuator 210a is under static loading.

The transmission 240a may include a sliding joint housing 242 that couples the motor 220 to the support structure 250 and reacts a lateral force to the chassis 12 via the support structure 250. As shown, the transmission 240a may include links 245a and 245b that couple at one end to the first stator 222 at node 246 and the second stator 223 at node 247, respectively, and at another end to the joint housing 242 at node 243. The links 245a and 245b may be coupled to the nodes 247, 246 and 243 via pin joints (or ball joints) to allow rotational motion about the respective nodes while limiting translational motion. The joint housing 242 may be slidable along the support structure 250. Additionally, the second stator 223 may be directly coupled to the chassis 12 via link 248a. As shown, link 248a may also be coupled to node 247 on the second stator 223 and the chassis 12 via pin joints. The link 248a may be a tension-compression member that is rigid or compliant.

The torque sources coupled to the first stator 222 and second stator 223 can generate input torques independently from one another. However, the first stator 222 and the second stator 223 may be coupled to each other via the transmission 240a. Furthermore, the actuator 210a is coupled to the other components of the actuator assembly 200a at three locations (i.e., the rotor 221 to the reference ground 11, the support structure 250 to the chassis 12 via the strut 253, and the second stator 223 to the chassis 12 via the link 248a). Thus, the actuator 210a may provide up to three force/torque outputs for two independent inputs.

Input Torques and Reacted Torques

As mentioned above, the actuators described herein may provide multiple outputs to mechanically actuate various subsystems (e.g., rotate a wheel, actuate a suspension) of a system (e.g., a vehicle). With respect to the actuator assembly 200a depicted in FIG. 2A, the actuator 210a may provide multiple force and/or torque outputs to (1) rotate the rotor 221 (e.g., rotate a wheel coupled to the rotor for propulsion) and/or (2) translate the actuator 210a relative to the chassis 12 and/or reference ground 11 by slidably adjusting the support structure 250 along the strut 253 (e.g., actuate a suspension) and/or compensate for undesirable forces and/or motion in the system (e.g., providing anti-dive when the vehicle is braking and/or anti-squat when the vehicle is accelerating to increase vehicle stability and/or operator comfort) based on the surplus force between the first stator 222 and the second stator 223. In this example, the surplus force produced by the reactive torques applied to the first stator 222 and second stator 223 of the actuator 210a may be separated into two force components applied along different directions (e.g., two orthogonal force components). The magnitude and/or direction of the two force components may be coupled. Furthermore, the surplus force may be applied as a non-zero force via link 248a and/or as separate component forces at (1) the link 248a and (2) the strut 253 via the support structure 250.

In one case, the torque source coupled to the first stator 222 may generate an input torque that is applied to the rotor 221 while the torque source coupled to the second stator 223 remains inactive. The input torque may cause the rotor 221 to rotate about the rotation axis 13 relative to the reference ground 11. When the first stator 222 generates the input torque, a corresponding reactive torque is also generated and applied to the first stator 222. The magnitude of the reactive torque and the input torque may be substantially equal, but the direction along which the torques are applied may be substantially opposite. For example, the input torque applied to the rotor 221 may be along a clockwise direction and the reactive torque applied to the first stator 222 may be along a counterclockwise direction.

The reactive torque applied to the first stator 222 may cause the first stator 222 to rotate about the rotation axis 13. However, the motion of the first stator 222 may be constrained by the link 245a of the transmission 240a, which is coupled to the first stator 222 at node 246. Said another way, at least a portion of the reactive torque applied to the first stator 222 may be transferred to the transmission 240a via the link 245a. The portion of the reactive torque transferred to the transmission 240a may cause the joint housing 242 to slide along the support structure 250 and/or be transferred to the second stator 223 via the link 245b.

If the second stator 223 were decoupled from the chassis 12, the reactive torque would cause the first stator 222 and second stator 223 to rotate about the rotation axis 13 in opposite directions while the joint housing 242 in the transmission 240a would slide along the support structure 250. With the removal of link 248a between the second stator 223 and the chassis 12, any forces between the chassis 12 and the actuator 210 would be applied via the support structure 250 through the suspension. The stator 222 would inertially accelerate itself and pull on the transmission 240a. The support structure 250 would supply the torque coupling required by the transmission 240a to inertially accelerate stator 223 via link 245b. The spindle 224 would react the forces from the reference ground 11 along with the coupling forces from the stator inertial loadings to the supporting structure, which would in turn be reacted by the suspension.

However, by coupling the second stator 223 to the chassis 12 via the link 248a, a net force is imparted between the actuator 210a and the chassis 12 that causes the actuator 210a to translate along the strut 253 (i.e., toward or away from the reference ground 11). In reference to the view of the actuator assembly 200a shown in FIG. 2A, the actuator 210a translates towards the reference ground 11 if the reactive torque is applied to the first stator 222 along a clockwise direction about the rotation axis 13. In contrast, the actuator 210a translates away from the reference ground 11 if the reactive torque is applied along a counterclockwise direction about the rotation axis 13.

In another case, the torque source coupled to the second stator 223 may generate an input torque that is applied to the rotor 221 while the torque source coupled to the first stator 222 remains inactive. Similar to the previous case, the input torque may cause the rotor 221 to rotate about the rotation axis 13 relative to the reference ground 11. A corresponding reactive torque (similar magnitude but applied in an opposite direction to the input torque) may also be applied to the second stator 223. In this case, however, the reactive torque may be transferred directly to the chassis 12 through the link 248a rather than being transferred indirectly via the transmission 240a. The reactive torque may initially cause actuation of the transmission 240a and rotation of the first stator 222. However, under steady state conditions, the reactive torque applied to the second stator 223 may be transferred primarily to the chassis 12 via link 248a. Similar to the previous case, the reactive torque may cause the actuator 210a to translate towards or away from the reference ground 11 based on the translation of the support structure 250 along the strut 253.

For the cases above, the magnitudes and directions of the output forces and torques generated by the actuator 210a may be controlled, in part, by adjusting the magnitudes and/or directions of the torques imparted by the first stator 222 and second stator 223 on the rotor 221. However, imparting torque via only the first stator 222 or the second stator 223 may cause the output forces/torques to occur simultaneously, which may not be desirable. For example, it may be preferable to rotate a wheel coupled to the rotor 221 and spindle 224 without causing the actuator 210a to translate relative to the chassis 12. For such cases, the actuator 210a may provide certain outputs by imparting torque with the first stator 222 and second stator 223 at the same time.

In some cases, the actuator may superimpose the input torques and/or reactive torques generated by the torque sources to produce summated and differential torques that selectively control which outputs are supplied by the actuator. For the actuator 210a shown in FIG. 2A, input torques imparted by the first stator 222 and the second stator 223 in the same direction cause the rotor 221 to rotate in the opposite direction. Thus, the torque experienced by the rotor 221 may be viewed as the vector sum of the imparted torques, neglecting friction and mechanical advantage (discussed below). At the same time, the torque experienced by the transmission 240a can be viewed as the vector difference of the imparted torques, again neglecting friction and mechanical advantage. The mechanical advantage experienced by the transmission 240a may provide a surplus force that can be used as an additional output from the actuator 210a (e.g., for anti-dive, anti-squat functions).

For example, the first stator 222 and the second stator 223 may impart input torques with the same magnitude and direction. The summated torque may thus have twice the magnitude of the input torques, thus causing the rotor 221 to rotate about the rotation axis 13. The reactive torques applied to the first stator 222 and second stator 223 similarly have the same magnitude and are applied in the direction opposite to the input torques. Instead, a reactive force is produced between the support structure 250 and the strut 253 mounted to the chassis 12.

In another example, the first stator 222 and the second stator 223 may impart oppositely directed input torques with the same magnitude to the rotor 221. In this case, the input torques impede the rotation of the rotor 221 (i.e., the input torques cancel each another). The resulting reactive torques applied to the first stator 222 and the second stator 223 similarly have the same magnitude but are applied in opposite directions with respect to the rotation axis 13. Thus, the reactive torques cause the transmission 240a to actuate and/or a net differential torque output (i.e., the differential torque has constructive interference of the respective reactive torques). This, in turn, results in the translation of the actuator 210a along the strut 253 (actuating the suspension).

In general, the first stator 222 and the second stator 223 may provide input torques with varying magnitudes and directions. The relative magnitude of the output forces/torques provided by the actuator 210a may thus be changed based on the magnitude and/or direction of the input torques and the corresponding reactive torques. In general, adjustments to the magnitude and/or direction of one or both input torques in the actuator 210a may cause one or more of the following outputs to occur: (1) rotating the rotor 221, (2) translating the actuator 210*a* along the strut 253, and (3) generating a reactive force between the support structure 250 and strut 253. The relative magnitude and/or direction of one or more of the output forces/torques provided by the actuator 210*a* may be adjusted in a substantially continuous (or discrete) manner with respect to the input torques. For example, a continuous change in magnitude and/or direction of the input torque(s) results in a continuous change to the output force/torque.

Mechanical Advantage and Motion Ratios

Additionally, the transmission 240*a* may provide a mechanical advantage, which can be quantified as a motion ratio that depends on the relative positions of the first stator 222 and the second stator 223. The motion ratio depends on the structure of the motor 220, the transmission 240*a*, the support structure 250, and the connections among these components and their subcomponents, including link lengths and shapes and node positions. In FIG. 2A, for example, the links 245*a* and 245*b* in actuator 210*a* have the same length and are coupled symmetrically to nodes 247 and 246, which are at a similar radial distance from the rotation axis 13. Thus, rotation of the first stator 222 causes rotation of the second stator 223 with a 1:1 motion ratio.

In other embodiments, the geometry of the links 245*a* and 245*b* and/or the location of the nodes 247 and 246 may be changed to produce a different motion ratio between the first stator 222 and the second stator 223, which, in turn, modifies the dependence of each output force/torque from the actuator 210*a* on the input torques on the first stator 222 and/or the second stator 223. For example, the transmission 240*a* may be configured such that a reactive torque applied to the first stator 222 produces a larger torque between the actuator 210*a* and the chassis 12 than a reactive torque applied to the second stator 223 (e.g., the first stator 222 may function in an analogous manner to a lower gear that produces more torque in a vehicle transmission). The reactive torque applied to the second stator 223 may instead produce a faster rate of actuation between the actuator 210*a* and the chassis 12 than the reactive torque applied to the first stator 222 (e.g., the second stator 223 may function in an analogous manner to a higher gear that allows for higher speed in a vehicle transmission).

In another example, the range of motion of the first stator 222 and the second stator 223 may be modified to make the output forces/torques depend, in part, on the angular positions of the first stator 222 and the second stator 223. For instance, mechanical stops may be incorporated into the actuator 210*a* that limit the range of rotation of the first stator 222 and the second stator 223. The mechanical stops may define an angular range where the actuator 210*a* can produce a differential torque output at a particular node. The mechanical stops may be coupled to the support structure 250. In this manner, the geometry of the actuator 210*a* and its internal and external connections may be selected to tune the various output forces/torques produced by the actuator 210*a*.

The transmission 240*a* may also produce an asymmetric response between the first stator 222 and the second stator 223. For example, the second stator 223 may rotate in response to a reactive torque being applied to the first stator 222, but the first stator 222 may not rotate in response to a reactive torque being applied to the second stator 223. This may be accomplished, for example, by using a ratcheting mechanism that only allows the first stator 222 to rotate along one direction (e.g., only clockwise, only counterclockwise) while the second stator 223 is free to rotate in one or more directions (e.g., clockwise and counterclockwise). An asymmetric response between the first stator 222 and the second stator 223 may provide another parameter to modify the dependence of the output forces/torques on the input torques and/or the reactive torques. The motion ratio between the two stators does not need to be constant or linear.

An Actuator with a Stator Coupled to a Chassis via a Rocker Joint

FIG. 2B shows another exemplary actuator assembly 200*b* with a rocker joint transmission 240*b* and a stator directly coupled to a chassis 12. As shown, the actuator assembly 200*b* shares several similarities to the actuator assembly 200*a* of FIG. 2A. The actuator assembly 200*b* includes a motor 220, a transmission 240*b*, and a support structure 250 as in FIG. 2A. The motor 220 includes a rotor 221 coupled to a spindle 224 defining a rotation axis 13. The spindle 224 is again coupled to a reference ground 11. The motor 220 also includes a first stator 222 and a second stator 223 that each support a torque source and are coaxial with the spindle 224. The spindle 224 is supported by the support structure 250 (e.g., a strut housing) that is slidably adjustable along a strut 253 that is rigidly mounted to the chassis 12. The springs 254*a* and 254*b* may be used to provide a restoring force to the actuator 210*b*.

In this case, the rocker joint transmission 240*b* includes a rocker joint arm 244 that rotates about node 243. As shown, the transmission 240*b* includes a link 245*a* coupled to the first stator 222 at node 246 and a link 245*b* coupled to the second stator 223 at node 247 via respective pin joints (or ball joints). The links 245*a* and 245*b* are coupled to a rocker joint arm 244, which in turn is coupled to the support structure 250 at node 243. The rocker joint arm 244 may be coupled to the links 245*a* and 245*b* and the support structure 250 via respective pin joints (or ball joints).

The second stator 223 is also directly coupled to the chassis 12 by a link 248*b* that couples to the second stator 223 at node 249. Here, the node 249 is not collocated with the node 247. Instead, it is radially offset, e.g., with a cam as shown in FIG. 2B. The length of the link 248*b* and the (radial) location of the node 249 can be selected to provide a desired motion ratio between the rotation of the second stator 223 and the translation of the support structure 250.

The actuator assembly 200*b* may operate in a similar manner to the actuator assembly 200*a*, where the transmission 240*a* may be viewed as an instantaneous linearization of transmission 240*b*. The torque sources on the first stator 222 and the second stator 223 may each generate an input torque that is applied to the rotor 221, thus causing the rotor 221 to rotate about the rotation axis 13 relative to the reference ground 11. Each torque source may generate a corresponding reactive torque that is applied to the first stator 222 and the second stator 223. For the second stator 223, the applied reactive torque may be directly transferred to the chassis 12 via the link 248*b*, which in turn may cause the actuator 210*b* to translate along the strut 253 away or towards the reference ground 11.

For the first stator 222, the applied reactive torque may be transferred to the rocker joint arm 244 via the link 245*a*. This, in turn, may cause the rocker joint arm 244 to rotate about the node 243 relative to the support structure 250. However, the constraints imposed by the link 248*b* coupling the second stator 223 to the chassis 12 may instead cause at least a portion of the reactive torque transferred to the transmission 240*b* from the first stator 222 to be transferred to the second stator 223 via the link 245*b*. This reactive torque may then create a net force or torque between the actuator 210*b* and the chassis 12, resulting in the translation of the actuator 210*b* along the strut 253 via the support structure 250. A reactive force/torque may also be applied between the support structure 250 and the chassis 12, which may be used as another output (e.g., anti-dive, anti-squat).

The geometry of the rocker joint arm 244 may be modified to adjust the dependence of each output force/torque on the respective input torques and/or reactive torques generated by the torque sources on the first stator 222 and the second stator 223. For example, the length of the rocker joint arm 244 may affect the range of angular rotation for the first stator 222 and/or the second stator 223. The orientation of the rocker joint arm 244, which may depend on the respective locations of the nodes 247 and 246 and the length of the links 245*a* and 245*b*, may also affect the direction of the reactive force applied to the support structure 250 by the transmission 240*b*. For example, the rocker joint arm 244 may be an elongated member in which forces are primarily transmitted along the length of the arm (transverse forces are more likely to cause the rocker joint arm 244 to rotate).

An Axial Flux Motor with Panhard Link and Coaxial Drive and Differential Shafts

FIGS. 3A-3D show several views of an exemplary actuator 310 that is kinematically equivalent to the actuator 210*b* of FIG. 2B. As shown, the actuator 310 may include an axial flux motor 320. The motor 320 includes a rotor 321 mounted to a spindle 324. The motor 320 further includes a first stator 322 and a second stator 323 coaxially constrained by the spindle 324 and disposed on opposing sides of the rotor 321. As shown, the first stator 322 and the second stator 323 may each be coupled to respective housings that together form a substantially enclosed cavity to contain the rotor 321 while still allowing rotational motion between the first stator 322 and second stator 323.

The first stator 322 and the second stator 323 each include a torque source that comprises one or more magnets disposed on either the rotor 321 or the respective stators and one or more coils disposed on either the rotor 321 or the respective stators opposite to the one or more magnets. An electric current applied to the coil(s) via associated electronics (not shown) generates a magnetic field that, in turn, interacts with the permanent magnetic field of the magnet(s), causing the rotor 321 (and/or the stators) to rotate. For this axial flux motor 310, the magnets and coils are mounted on the faces of the rotor 321 and the stators, respectively. The motor 320 may also be a radial flux motor where the one or more magnets and coils are mounted on the periphery (e.g., the outer edge of the rotor 321, the inner edge of a stator surrounding the rotor 321) or a combination radial-axial flux motor.

The actuator 310 may include a support structure 350 that provides mechanical support to the motor 320 and the transmission 340. As described previously, the support structure 250 may remain static with respect to the reference frame of the actuator 310. Said in another way, the support structure 350 does not move relative to the motor 320 and the transmission 340, but does move with respect to a reference ground or chassis. As shown, the support structure 350 may allow the spindle 324 to rotate while constraining other degrees of freedom. The support structure 250 may also define an opening 311 to couple the support structure 350 to a strut housing (see FIGS. 4A-4C). As shown, the opening 311 may be shaped to allow insertion of the strut housing. One or more fasteners may be used to securely couple the support structure 350 to the strut housing.

The transmission 340 may include a first arcuate link 345*a* that couples to the first stator 322 at node 346 and a second arcuate link 354*b* that couples to the second stator 323 at node 347. The links 345*a* and 345*b* are coupled to a torsion bar 344 that rotates relative to the support structure 350 along a rotation axis through node 343. The torsion bar 344 may be disposed within an opening in the support structure 350 that allows the torsion bar 344 to rotate while constraining the torsion bar's other degrees of freedom. In this example, the support structure 350 constrains motion of the torsion bar's center of mass to a particular arc with respect to the support structure 350.

Like the actuator 210*b* in FIG. 2B, the actuator 310 in FIG. 3 is configured to generate a summated torque applied to the rotor 321 and a differential torque output. These output forces/torques may be used to actuate various subsystems. For instance, the summated torque may spin a drive shaft that in turn rotates a wheel. And the differential torque may actuate an active suspension system.

Figure 4A:
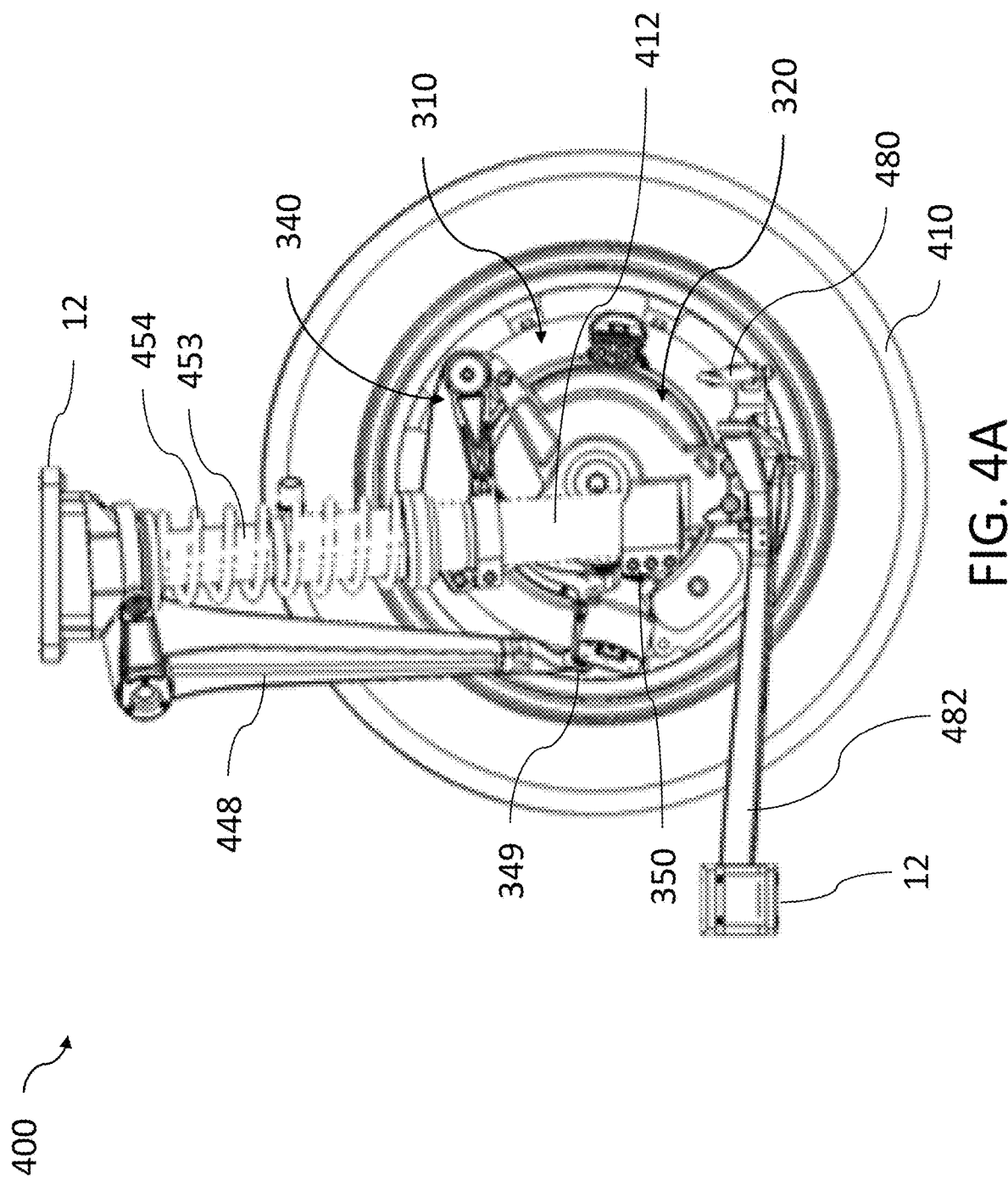
FIG. 4A shows an inboard view of an actuator assembly that includes the actuator of FIG. 3A coupled to a MacPherson strut suspension.
Figure 4B:
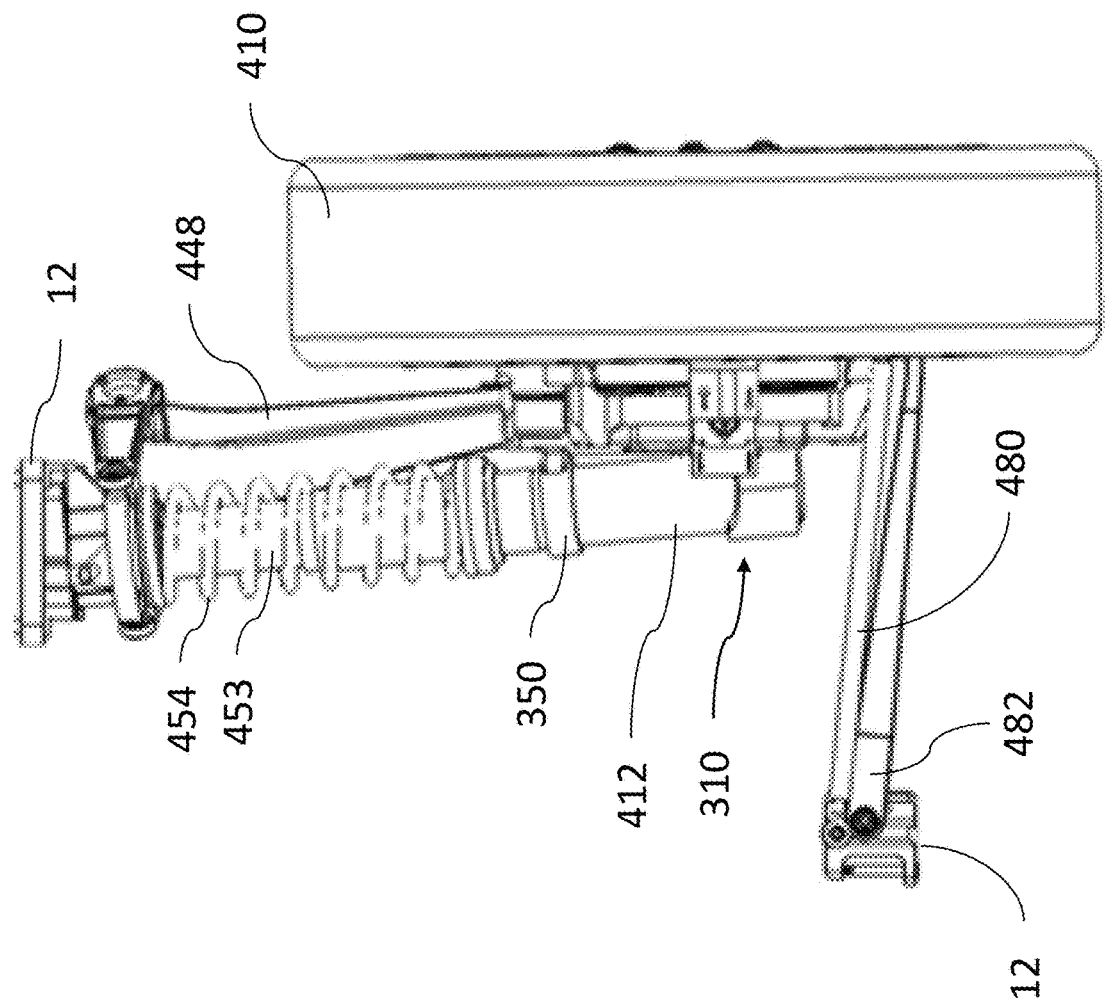
FIG. 4B shows a rear view of the actuator assembly of FIG. 4A.
Figure 4C:
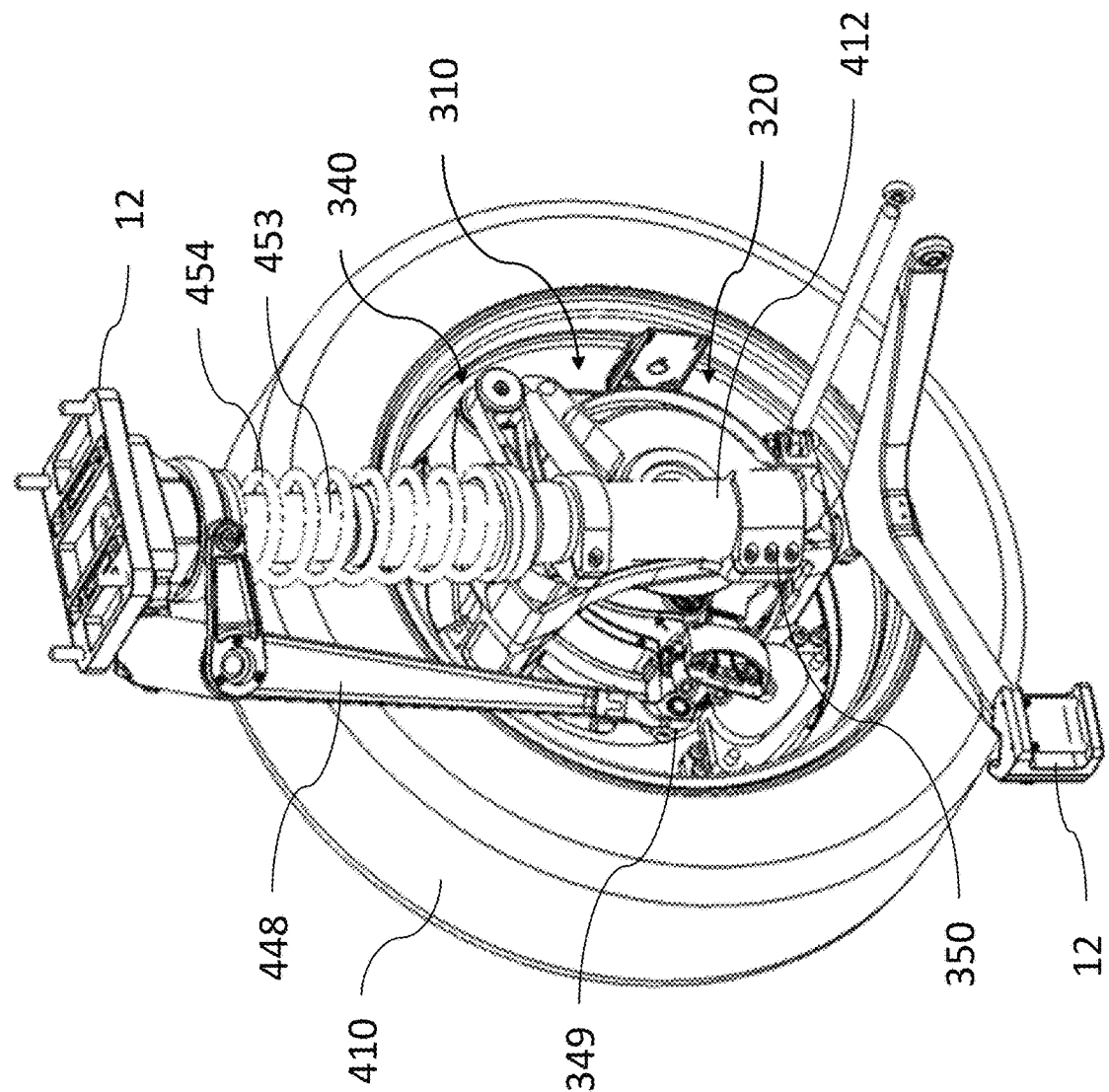
FIG. 4C shows a perspective view of the actuator assembly of FIG. 4A.
Figure 5A:
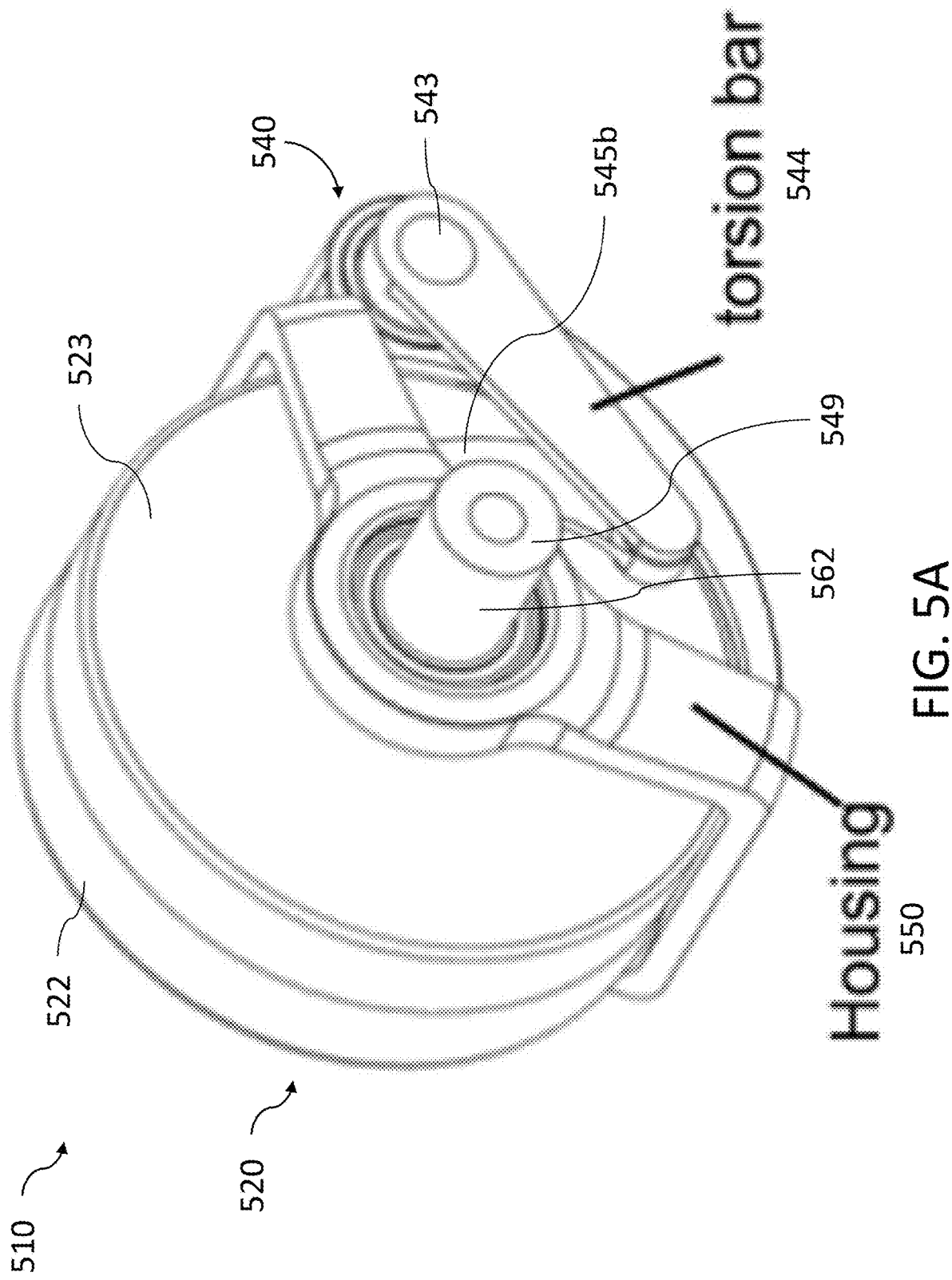
FIG. 5A shows a perspective view of an exemplary actuator with a Panhard link and a differential shaft coaxial with the drive shaft.
Figure 5B:
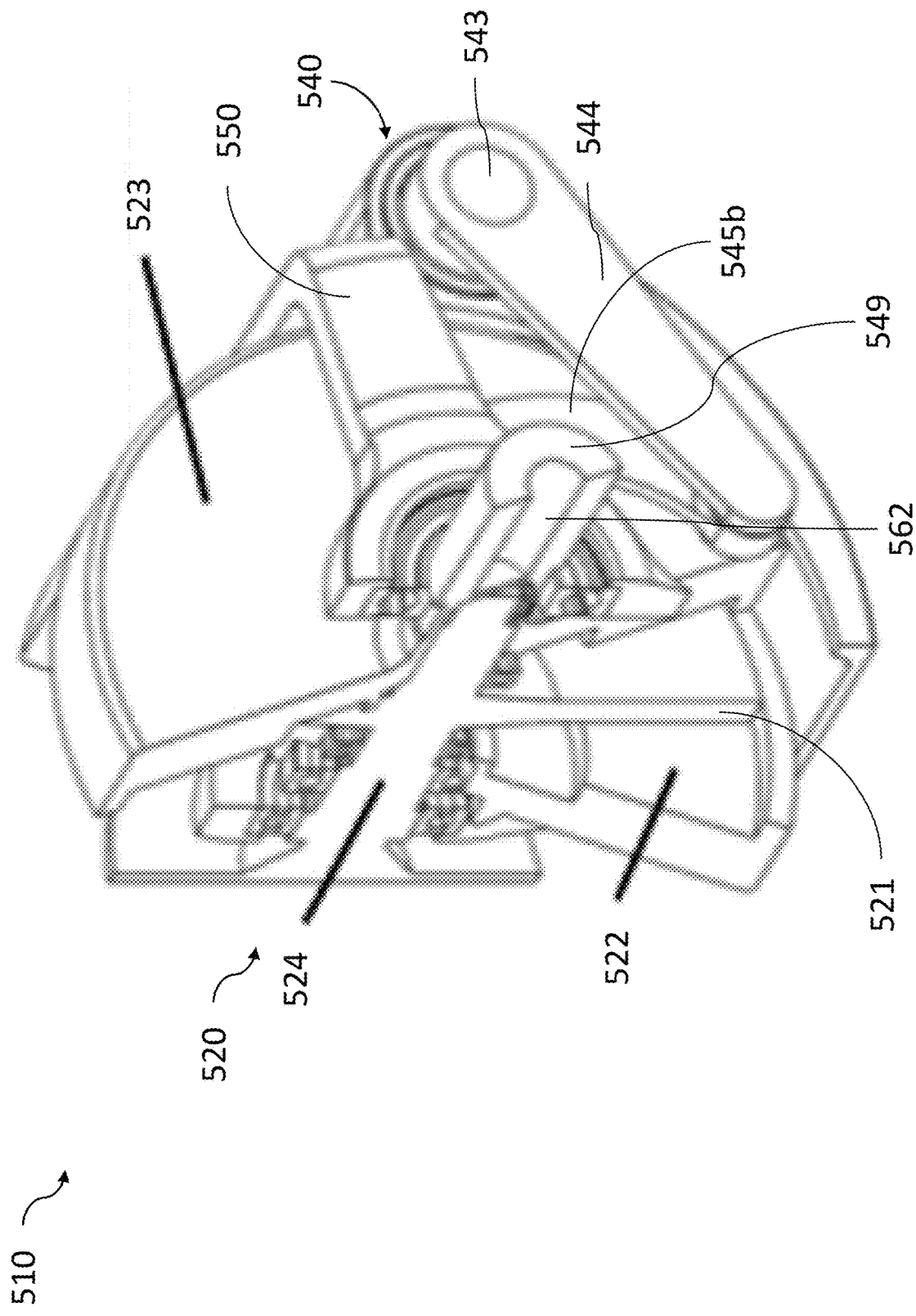
FIG. 5B shows a cross-sectional perspective view of the actuator of FIG. 5A.
Figure 5C:
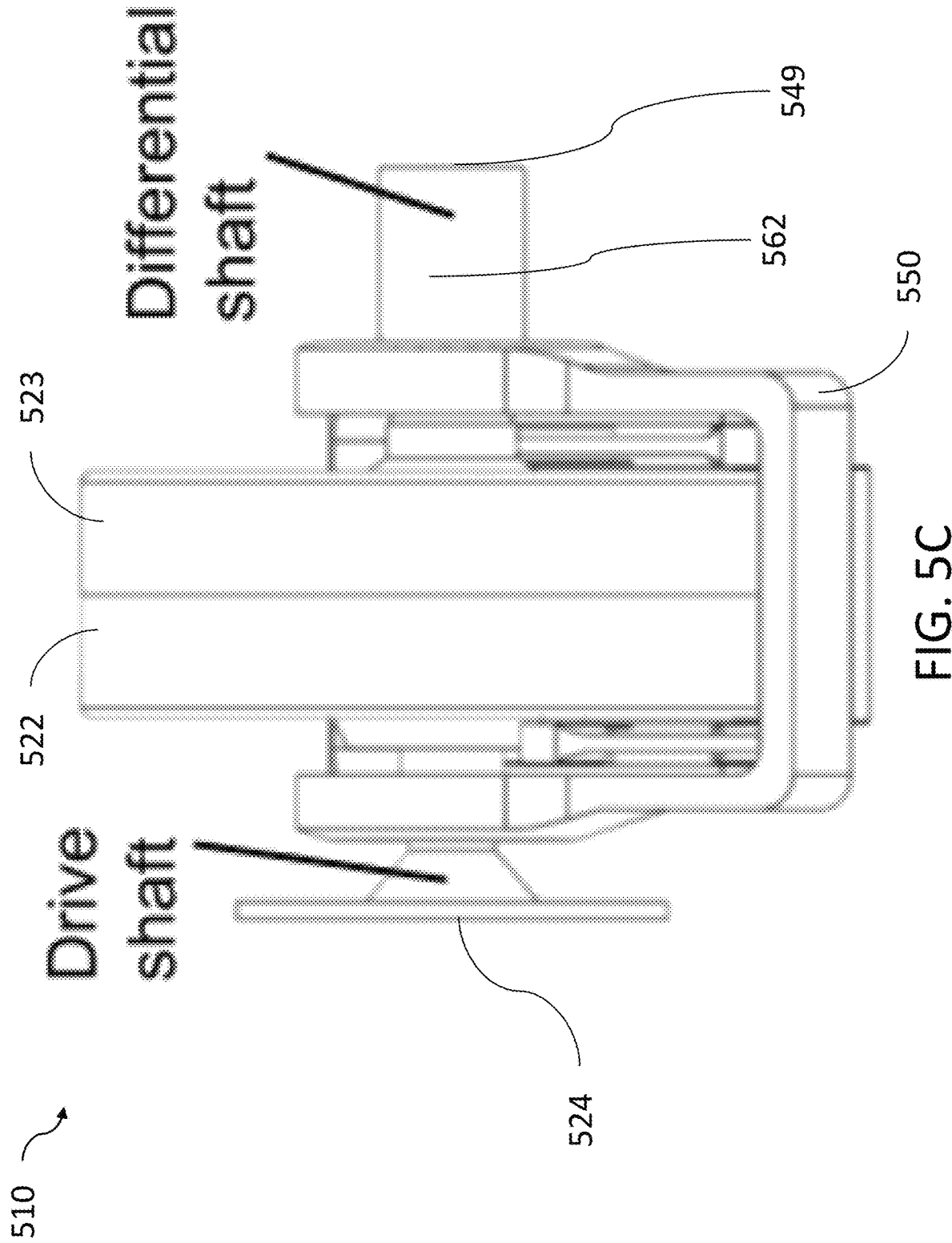
FIG. 5C shows a rear view of the actuator of FIG. 5A.
Figure 5E:
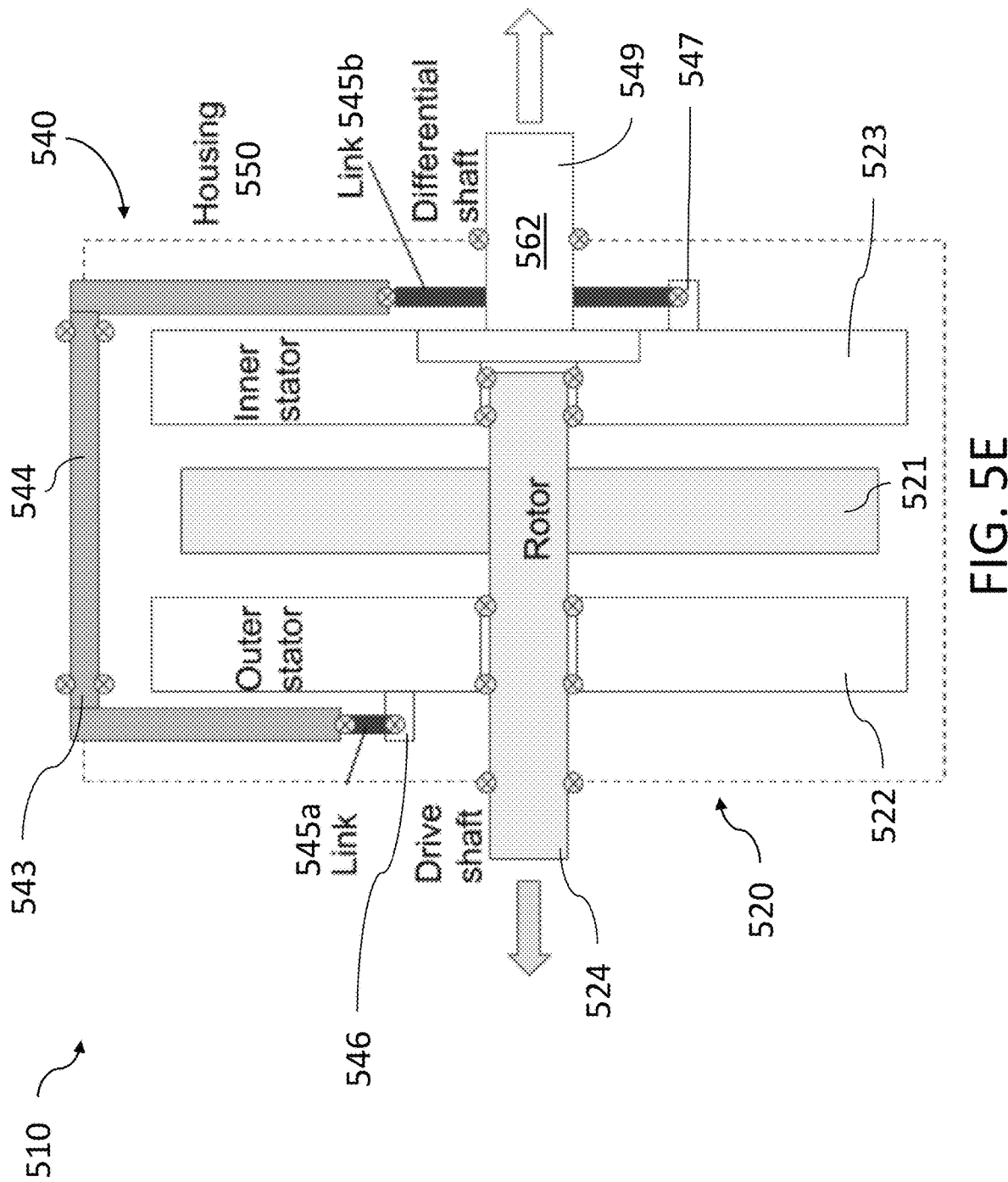
FIG. 5E shows a cross-sectional schematic of the actuator of FIG. 5A.

FIGS. 4A-4C show several views of an actuator assembly 400 that incorporates the actuator 310 of FIGS. 3A-3D. As shown, the actuator 310 is integrated into a suspension system where the actuator 310 utilizes the summated torque to rotate a wheel 410 coupled to the spindle 324. The differential torque is used to actuate a suspension coupled to a chassis 12.

FIGS. 4A-4C shows the support structure 350 of the actuator 310 coupled to a strut housing 412 via the opening 311. The strut housing 412 is slidably adjustable along a strut 453 coupled to the chassis 12. A spring 454 is disposed along the strut 453 and coupled to the chassis 12 and the support structure 350 to provide a restoring force as the suspension is actuated. The actuator assembly 400 further includes a link 448 (shown as a tension-compression member or pushrod) that couples the second stator 323 to the chassis 12 at node 349. As shown, the link 448 may be coupled to the second stator 323 and the chassis 12 via respective ball joints. The actuator assembly 400 may also include a lower control arm 482 and a tie rod 480 that are each coupled at one end to the chassis 12 and the other end to the support structure 350. The lower control arm 482 and the tie rod 480 may further constrain the kinematic motion of the support structure 350. Thus, the strut housing 412, the strut 453, the lower control arm 482, and the tie rod 480 together form a MacPherson strut suspension.

The reactive torques applied to the first stator 322 and the second stator 323 may produce a surplus force that may be transferred along the link 448 to the chassis 12 to translate the actuator 310 along the strut 453 via the strut housing 412 and/or to prevent the compression or extension of the actuator 310 when a vehicle is braking or accelerating, respectively. As described above, reactive forces/torques may be generated between the strut housing 412 and the strut 453, which can provide another output (e.g., reacting a force component).

An Axial Flux Motor with Rocker Link and Offset Drive and Differential Shafts

FIGS. 5A-5E show another exemplary actuator 510 with a transmission 540 having a rocker link that constrains the motion of a first stator 522 and a second stator 523 in an axial flux motor 520. Similar to the actuator 310, the transmission 540 includes a torsion bar 544, which is a mechanically stiff component constrained by the support structure 550 to rotate along an axis parallel to the rotation axis of the spindle 524. The torsion bar 544 is coupled to the first stator 522 via link 545*a* at node 546 and to the second stator 523 via link 545*b* at node 547. The links 545*a* and 545*b* are rotatably free at their respective joints. The support structure 550 may be mounted to a suspending or load reacting reference frame (e.g., a vehicle chassis). For this case, the second stator 523 may be coupled to an external subsystem at node 549 via a differential shaft 562 on the second stator 523. The differential shaft 562 may rotate about the same rotation axis as the rotor 521 and spindle 524. Compared to the actuator 310, the actuator 510 operates in a similar manner except the differential torque is outputted via the differential shaft 562 rather than as a force through a link or pushrod member (e.g., link 448).

Figure 6A:
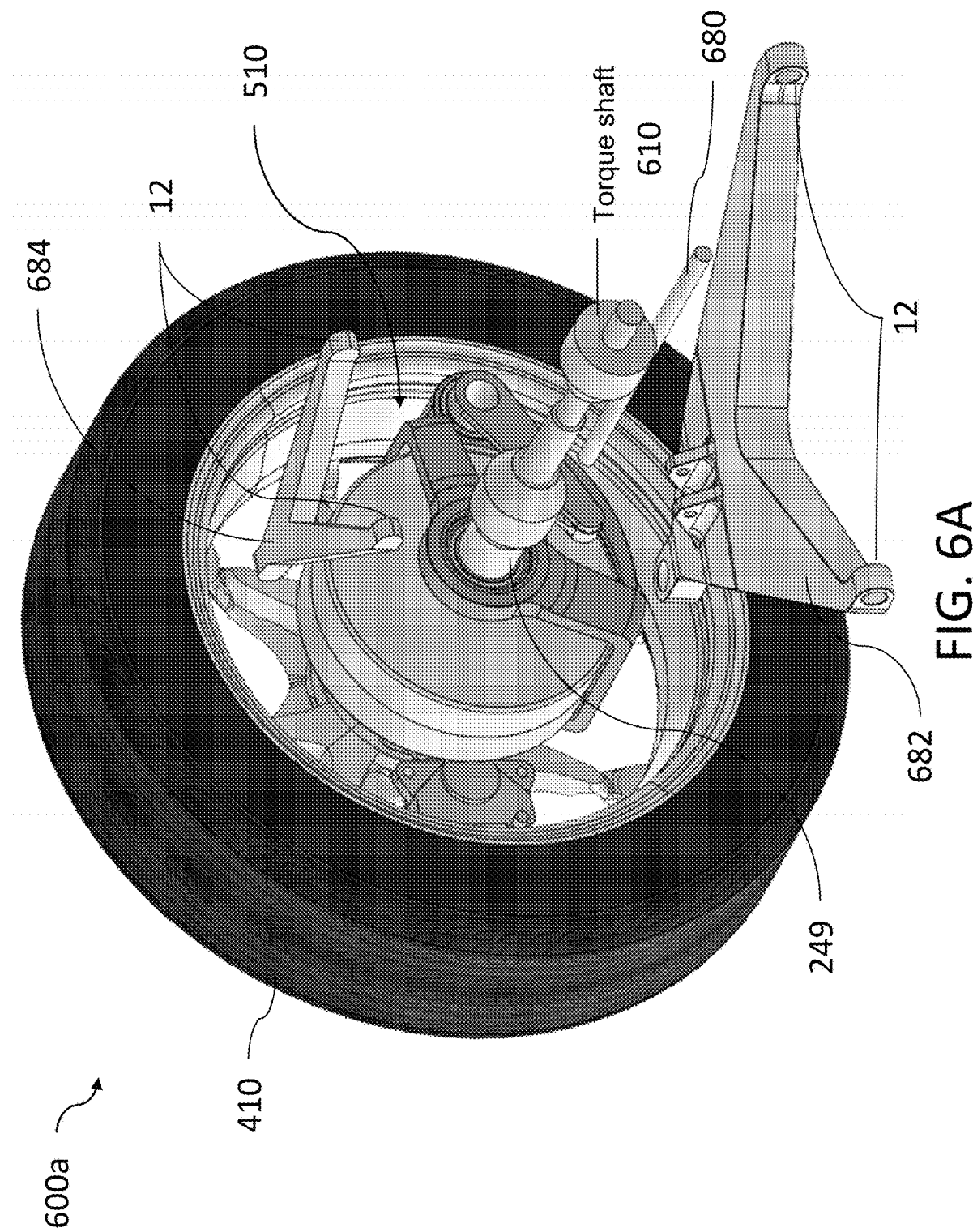
FIG. 6A shows an exemplary actuator assembly that includes the actuator of FIG. 5A as a hub motor.

FIG. 6A shows an exemplary actuator assembly 600a that incorporates the actuator 510 of FIGS. 5A-5E as a hub motor. As shown, the summated torque applied to the rotor 521 may rotate a wheel 410 mounted to the spindle 524. The differential torque provided by the differential shaft 562 may be applied to a torque shaft 610. In this manner, the actuator 510 does not directly generate a force/torque output to actuate the chassis 12 from an unsprung mass, but rather transfers the differential torque via the torque shaft 610 inboard to the chassis 12 as a pure torque. The torque transferred to the torque shaft 610 may be used to actuate other subsystems (e.g., actuate a suspension via another mechanism). The actuator assembly 600a also includes a lower A-arm 682, an upper A-arm 684, and a tie rod 680 that form part of the suspension. The A-arms 682 and 684 and the tie rod 680 are coupled to the chassis 12 and the support structure 550 (the portions of the support structure 550 to which the arms 682 and 684 and tie rod 680 are coupled to are not shown).

Figure 6B:
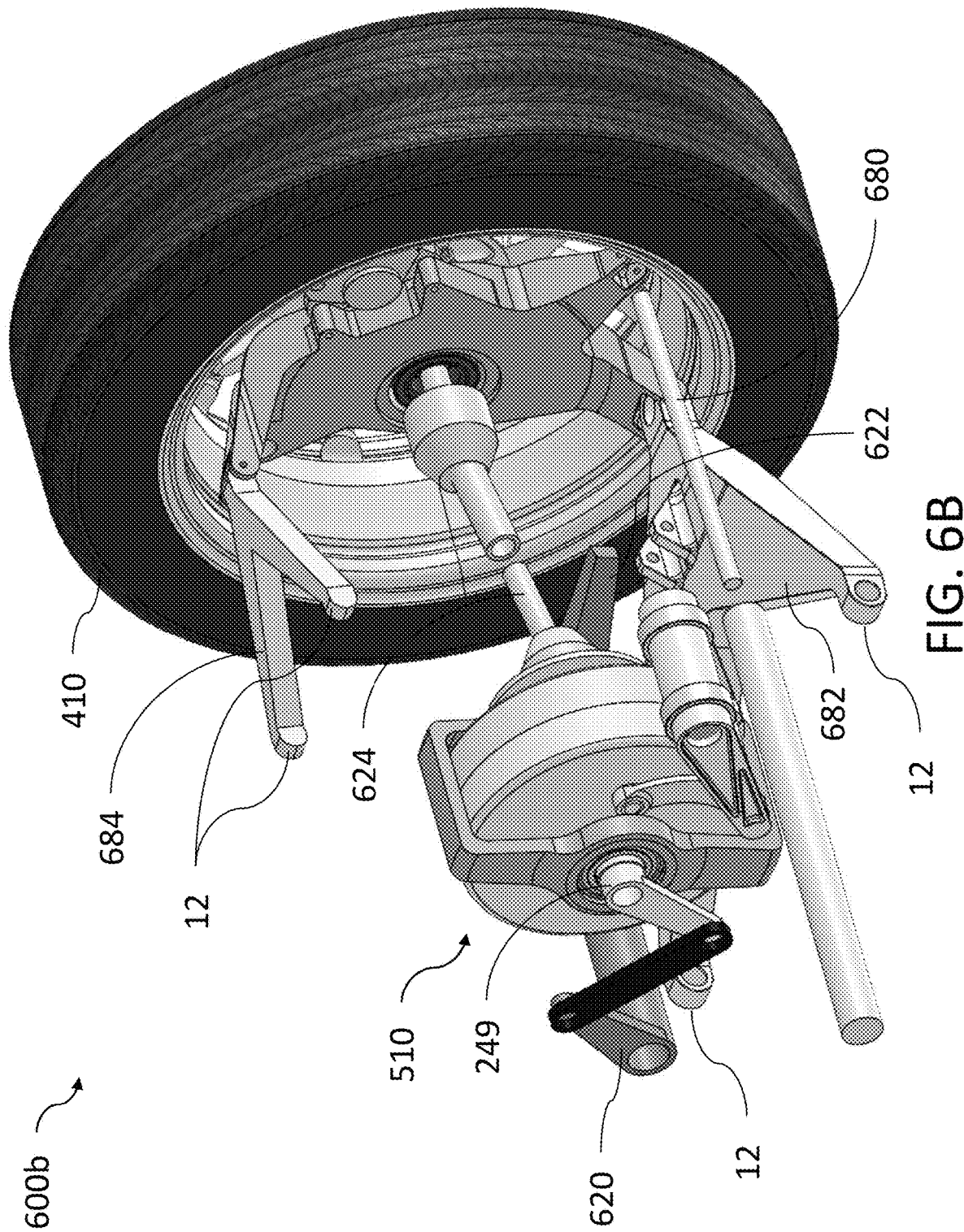
FIG. 6B shows another exemplary actuator assembly that includes the actuator of FIG. 5A mounted inboard with respect to a vehicle wheel.

FIG. 6B shows another exemplary actuator assembly 600b where the actuator 510 is mounted inboard on the sprung mass or chassis 12 of a vehicle. As shown, the actuator assembly 600b includes a driveshaft 624 that couples the spindle 524 of the motor 520 to the wheel 410. Thus, the summated torque applied to the rotor 521 may be used to rotate the wheel 410 via the driveshaft 624. The differential shaft 562 is coupled to a linkage 620 that transfers the differential torque to an actuating member 622, which may be coupled to other subsystems (e.g., actuate a suspension mechanism).

Figure 6C:
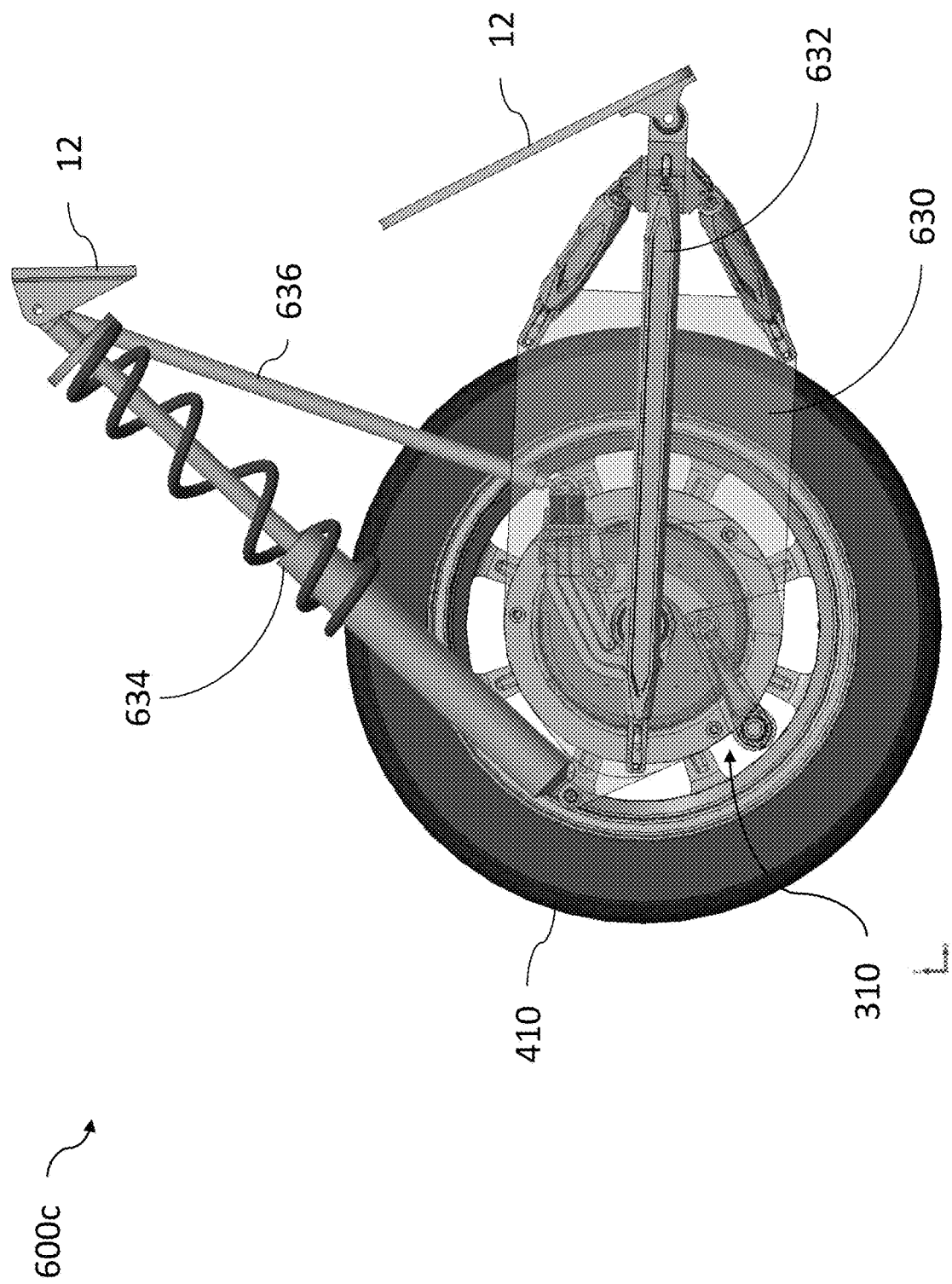
FIG. 6C shows a side view of another exemplary actuator assembly that includes the actuator of FIG. 5A integrated with a swing arm suspension in a wheel assembly.

FIG. 6C shows another exemplary actuator assembly 600c where the actuator 310 of FIGS. 3A-3D is incorporated into a swing arm suspension. A swing arm suspension is typically used in various types of vehicles including, but not limited to motorcycles, bicycles, and scooters. As shown, the actuator 310 may be mounted to a support frame 630, which may have a fork that supports both sides of the wheel 410. The support frame 630, in turn, may be mounted to the chassis 12 via an arm 632 (e.g., a leading arm, a trailing arm) that is rotatably coupled to the support frame 630 and the chassis 12. The arm 632 may constrain the travel of the wheel's center of mass to along a curved path (e.g., a circular arc). The support frame 630 may also be coupled to the chassis 12 via a shock absorber 634 to provide suspension. The shock absorber 634 may be coupled to the support frame 630 via a pin joint. The actuator 310 may be coupled to the chassis 12 via a rod 636 that is rotatably coupled to the chassis 12 and the actuator 310.

Thus, the rod 636 may be actuated by the actuator 310 (e.g., the differential torque) such that the rod 636 causes the strut 634 to contract or extend. The transmission 340 may couple the first stator 322 to the second stator 323 via the links 345a and 345b and the torsion bar 344, thus allowing the reactive torques to be transferred from the first stator 322 to the second stator 323 (or vice-versa). Thus, the rod 636 may be connected to either the first stator 322 or the second stator 323.

Axial Flux Motors with Bevel Gear Transmissions

FIG. 7A shows another exemplary actuator 710a that has a bevel gear transmission 740a. As shown, the actuator 710a may include an axial flux motor 720 with a rotor 721 mounted to a spindle 724. The motor 720 may include a first stator 722a and a second stator 723a disposed on opposite sides of the rotor 721 and coaxially constrained to rotate about the spindle 724 via one or more bearings (each represented as a circle with an "X"). The motor 720 may be supported and enclosed by a support structure 750. The transmission 740a may couple the first stator 722a to the second stator 723a via a bevel gear 748a. The bevel gear 748a may rotate with respect to the support structure 750 at node 743 via one or more bearings. In general, only one bevel gear 748a may be used; however, FIG. 7A shows the transmission 740a includes two bevel gears 748a to provide additional mechanical support.

The bevel gear 748a may include one or more gear teeth that mesh with corresponding gear teeth on the first stator 722a at node 746 and the second stator 723a at node 747. Thus, the rotation of the first stator 722a in response to a reactive torque causes the bevel gear 748a to rotate, which, in turn, causes the second stator 723a to rotate in the opposite direction. In this manner, the bevel gear transmission 740a provides counter-rotation between the first stator 722a and the second stator 723a. Thus, the actuator 710a operates kinematically in the same manner as the actuator 210b shown in FIG. 2B. A summated torque may be applied to rotate the rotor 721 and a differential torque may be outputted at a differential shaft 762 fixed to the second stator 723a. Reactive forces/torques may be applied to the support structure 750 via the bevel gears 748a.

Figure 7B:
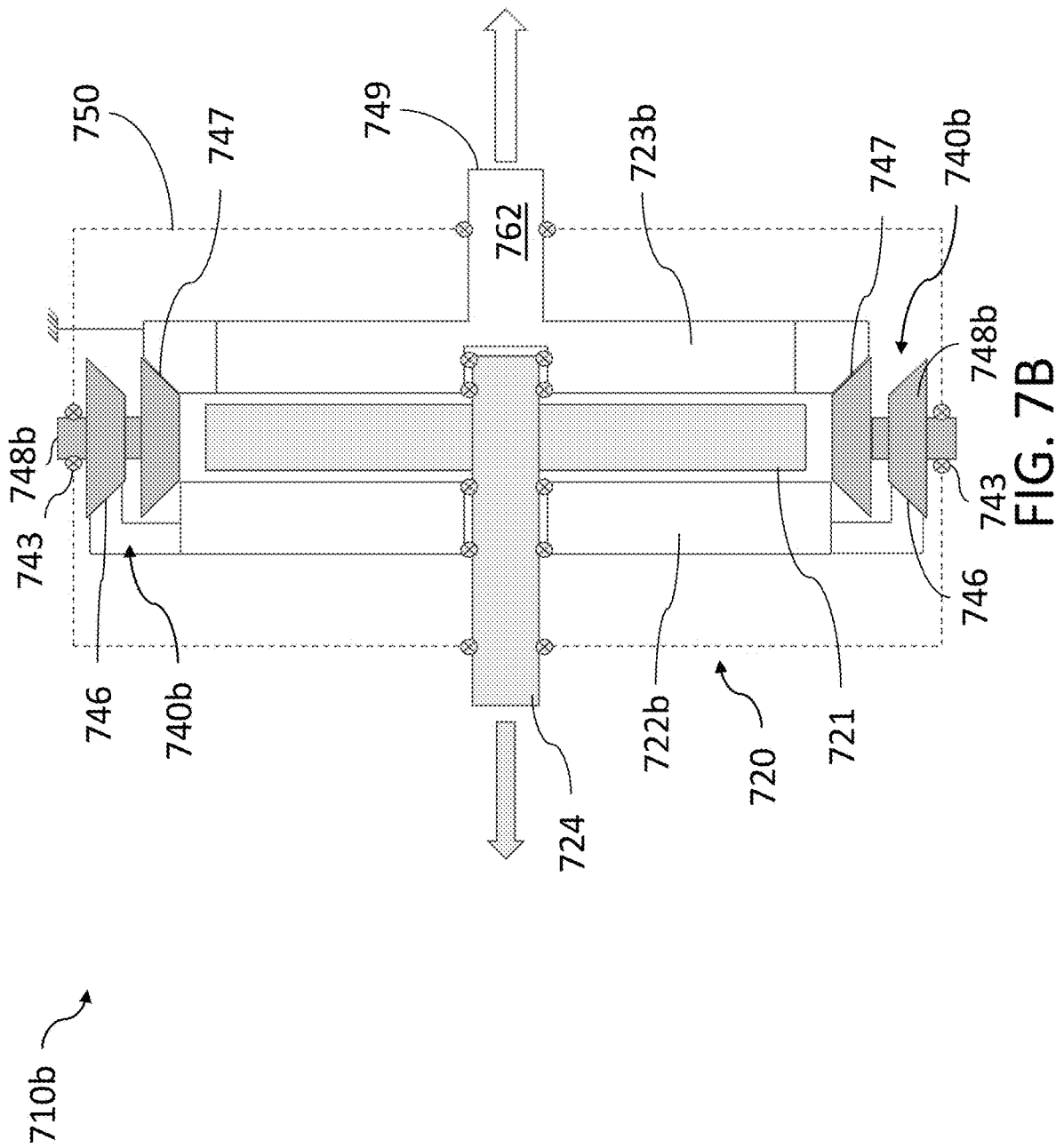
FIG. 7B shows a cross-sectional schematic of an exemplary actuator with a dual bevel gear transmission.

FIG. 7B shows another exemplary actuator 710b that has a transmission 740b with a dual bevel gear mechanism. The transmission 740b includes a dual bevel gear 748b meshed with the first stator 722b and the second stator 723b via separate bevel gears mounted to the same spindle 724. The dual bevel gear 748b may allow for different motion ratios between the first stator 722b and the second stator 723b based on the relative size of the bevel gears in the dual bevel gear 748b and/or the relative tooth diameters from the spindle axis 13. For example, the gear coupled to the first stator 722b may be larger than the gear coupled to the second stator 723b, which results in the amplification of torque transferred between the first stator 722b and the dual bevel gear 748b and/or the amplification of rotational speed between the second stator 723b and the dual bevel gear 748b.

FIG. 7C shows another exemplary actuator 710c that has a transmission 740c with a planetary gear mechanism. In this case, the transmission 740c may include a planetary gear 748c that rotates about a rotation axis parallel to the rotation axis of the spindle 724. As shown, the support structure 750 may constrain the other translational and rotational degrees of freedom of the planetary gear 748c. The actuator 710c may operate in a similar manner to the actuator 710a of FIG. 7A.

Figure 7D:
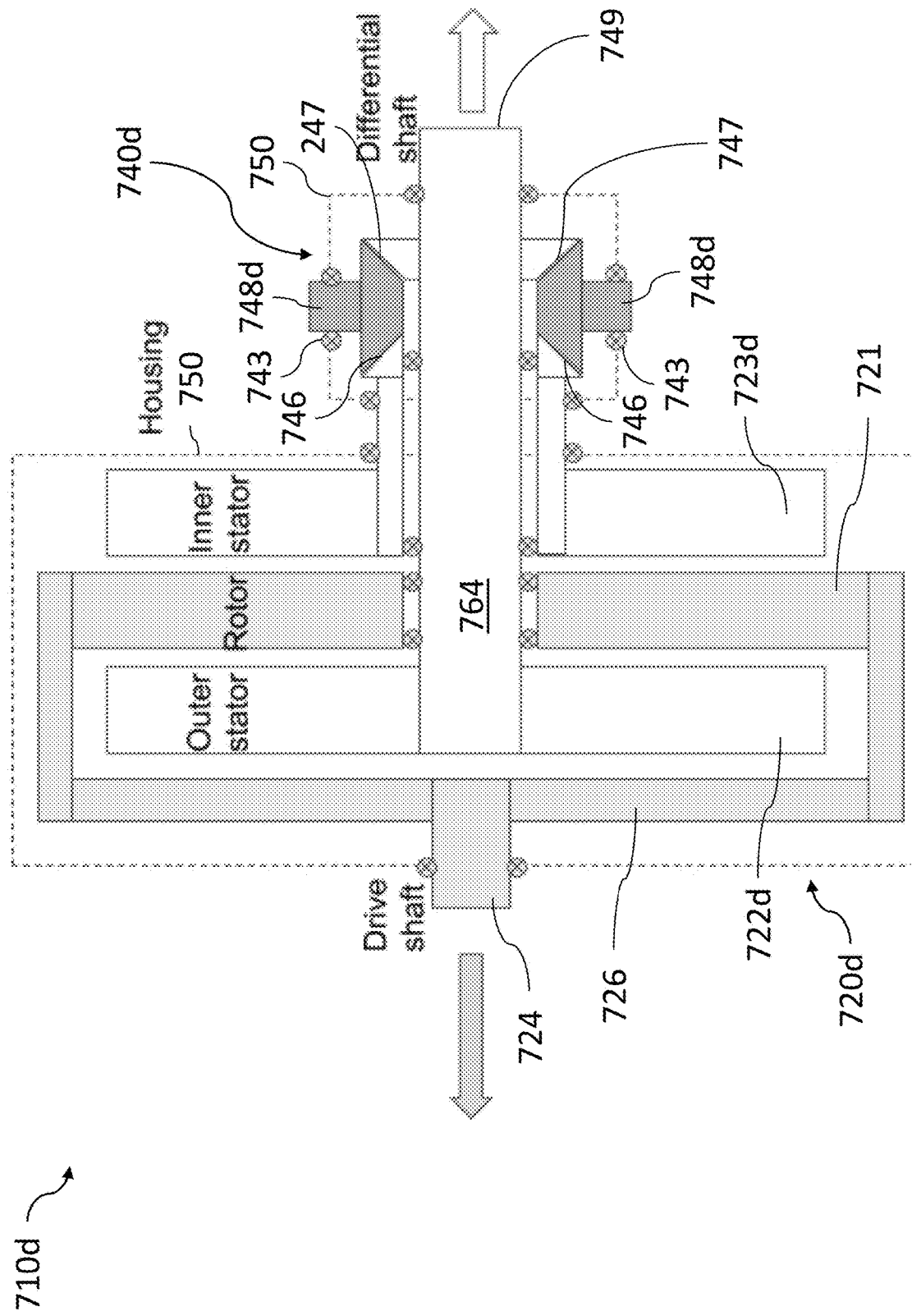
FIG. 7D shows a cross-sectional schematic of an exemplary actuator with a bevel gear transmission where the bevel gears are disposed outside the support structure housing the inner and outer stators.

FIG. 7D shows another exemplary actuator 710d where the transmission 740d includes a bevel gear mechanism housed in the support structure 750 from the motor 720, which is disposed in the support structure 750. In this case, the first stator 722d is mounted to a differential shaft 764 that transmits the differential torque. The rotor 721 and the second stator 723d are coaxial with the differential shaft 764. The rotor 721 further includes a drive shaft (spindle) 724 coupled to a rotor frame 726 that partially encloses the first stator 722d. The actuator 710d operates in a similar manner to the actuator 710a of FIG. 7A in that the transmission 740d includes a bevel gear 748d that meshes with the first stator 722d and second stator 723d. In this case, however, the second stator 723d transfers reactive torque to the first stator 722d via the transmission 740d.

Figure 7E:
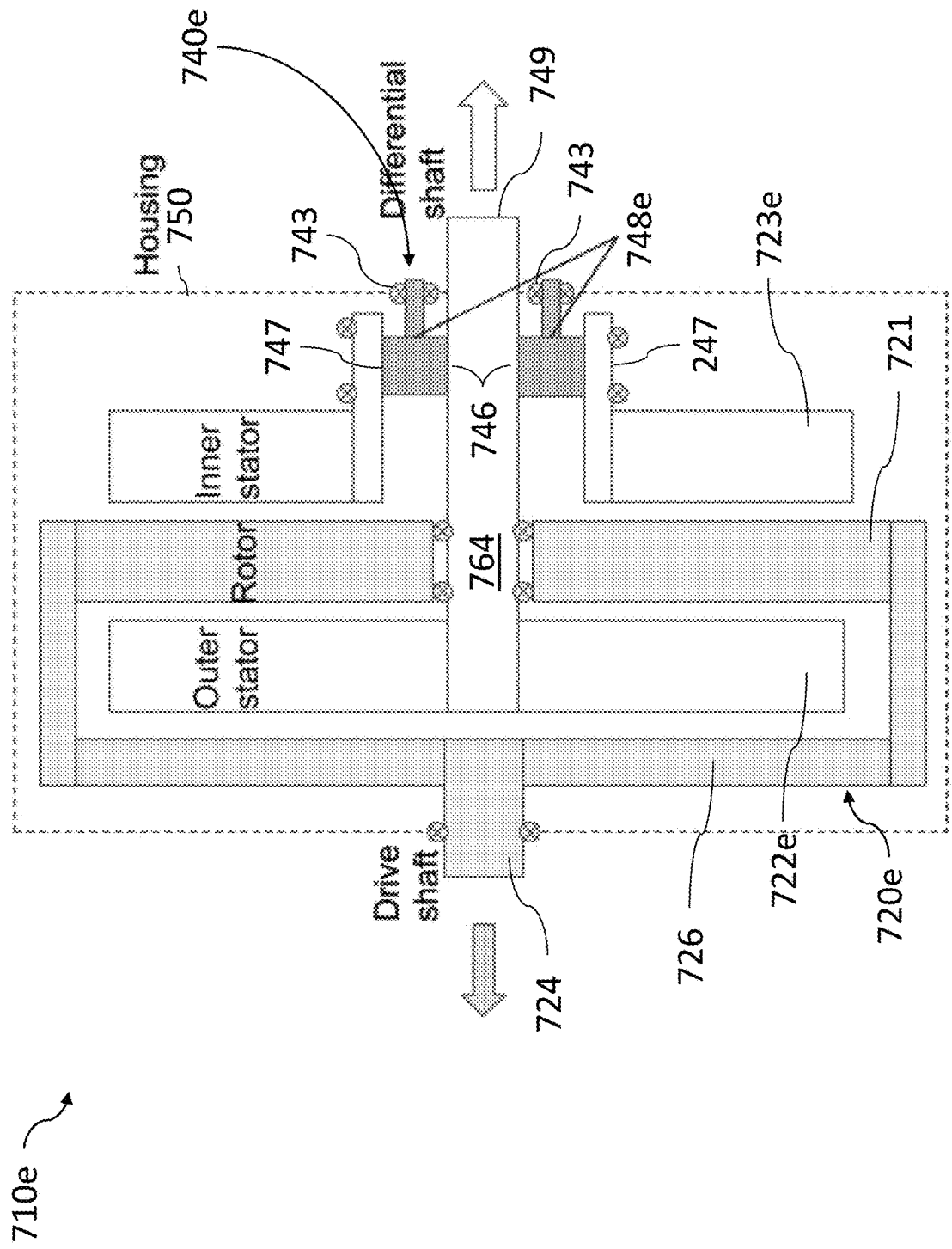
FIG. 7E shows a cross-sectional schematic of an exemplary actuator with a planetary gear transmission where the planetary gears couple the inner stator to a differential shaft on the outer stator.

FIG. 7E shows another exemplary actuator 710e where the transmission 740e includes a planetary gear mechanism and the first stator 722e outputs the differential torque via the differential shaft 764. The actuator 710e is similar to the actuator 710d except that the bevel gear 748d is replaced by a planetary gear 748e to couple the first stator 722e and second stator 723e. As shown, the planetary gear 748e may rotate about an axis parallel to the rotation axis of the differential shaft 764 and may be otherwise constrained by the support structure 750 along the other translational and rotational degrees of freedom.

Axial Flux Motors with Pulley Transmissions

Figure 8A:
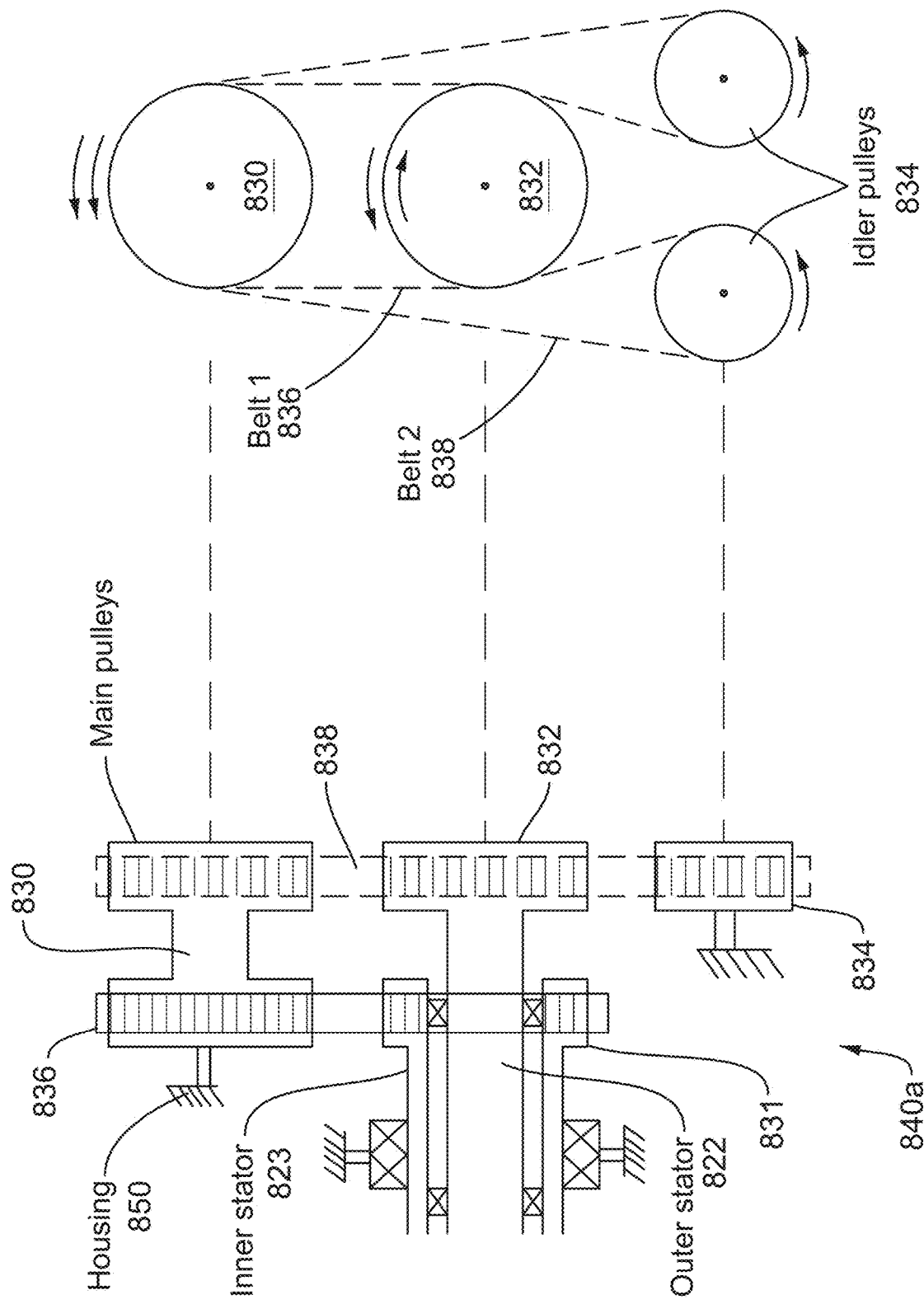
FIG. 8A shows an exemplary actuator with a multi-pulley transmission.

FIG. 8A shows an exemplary transmission 840a that uses a belt mechanism to transfer reactive torque. As shown, the first stator 822 may be coupled to a pulley 832 mounted to a shaft. The second stator 823 may be coupled to a pulley 831 mounted to a shaft that rotates concentrically about the first stator 822 via one or more bearings. The pulleys 831 and 832 may be coupled to a primary pulley 830 via belts 836 and 838, respectively. The primary pulley 830 may be coupled to and constrained by the support structure 850. Thus, rotation of the second stator 823 causes the primary pulley 830 to rotate via the belt 836, which in turn causes the first stator 822 to rotate via the belt 838 in an opposite direction. In this manner, the transmission 840a may provide similar functionality as the transmissions of FIGS. 2A-7E. The transmission 840a may also include idler pulleys 834 to guide and/or provide tension to the belt 838.

The idler pulleys 834 may be translationally constrained by the support structure 850. Additionally, chains and/or cables may be substituted for the belts 836 and 838. The belts 836 and 838 may rely on frictional contact with the respective pulleys to transfer torque. Thus, the dimensions of the belts 836 and 838 and/or the structure of the transmission 840a may be tailored to increase the contact area between the belts 836 and 838 and the respective pulleys to reduce slippage. In some cases, the belts 836 and 838 may have teeth that mesh to corresponding teeth on the pulleys to further reduce slippage. However, in some cases, it may be preferable for the belts 836 and 838 to slip in a controlled manner.

Figure 8B:
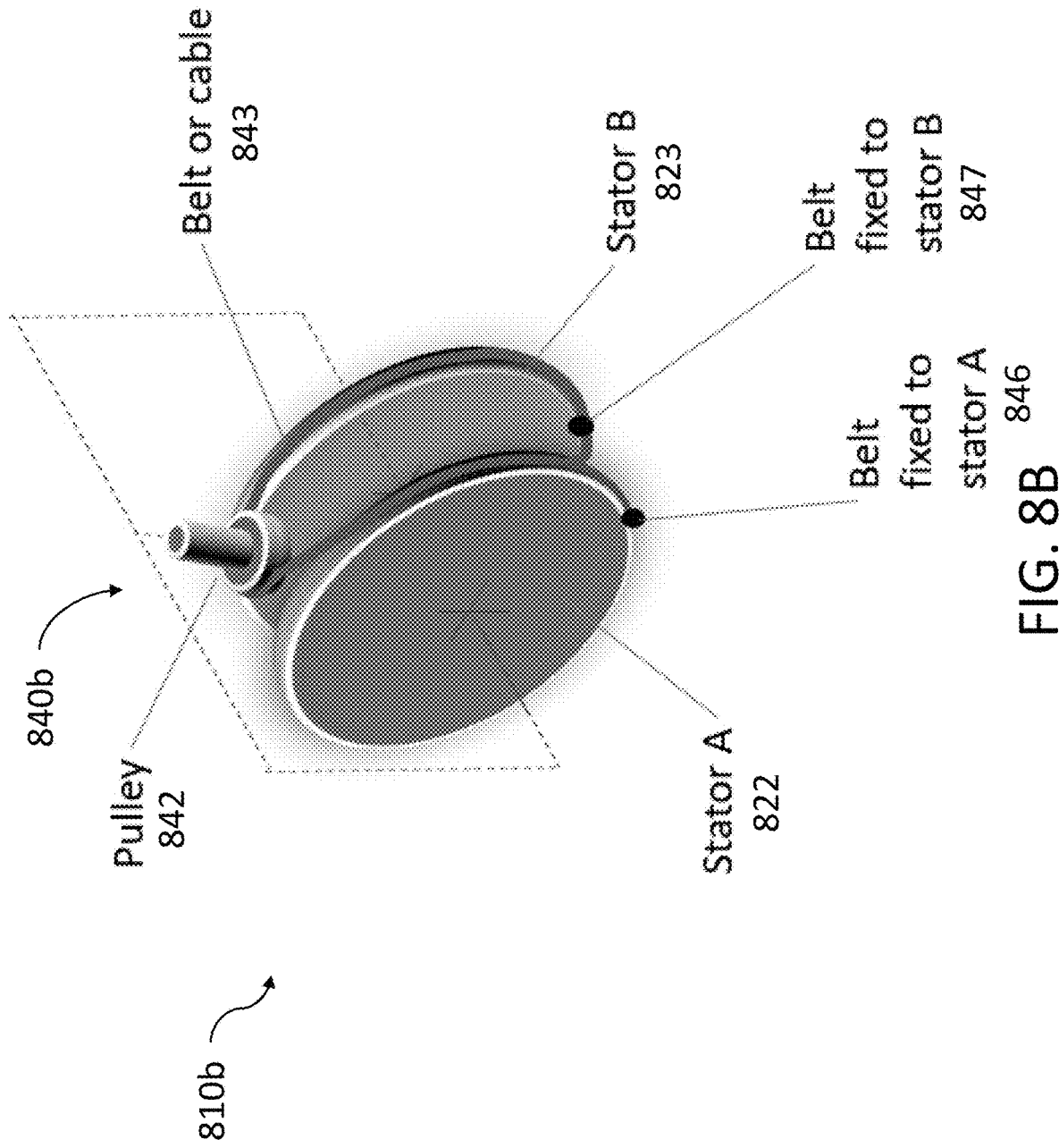
FIG. 8B shows an exemplary actuator with a single pulley actuated transmission.

FIG. 8B shows an exemplary actuator 810b with a single pulley transmission 840b. As shown, the actuator 810b may include a first stator 822 and a second stator 823 that rotate about the same rotation axis. The transmission 810b may include a belt 843 where one end is coupled to the first stator 822 at node 846 and the other end is coupled to the second stator 823 at node 847. The belt 843 may be guided by a pulley 842 disposed between the first stator 822 and the second stator 823. Thus, when the first stator 822 rotates, the belt 843 is pulled along the first stator 822. This, in turn, produces a tensile force along the belt 843 that causes the pulley 842 and the second stator 823 to rotate in response. In particular, the second stator 823 rotates in an opposite direction to the first stator 822. For this design, the length of the belt 843 may be tailored to adjust the range of angular displacement of the first stator 822 and the second stator 823.

Figure 8C:
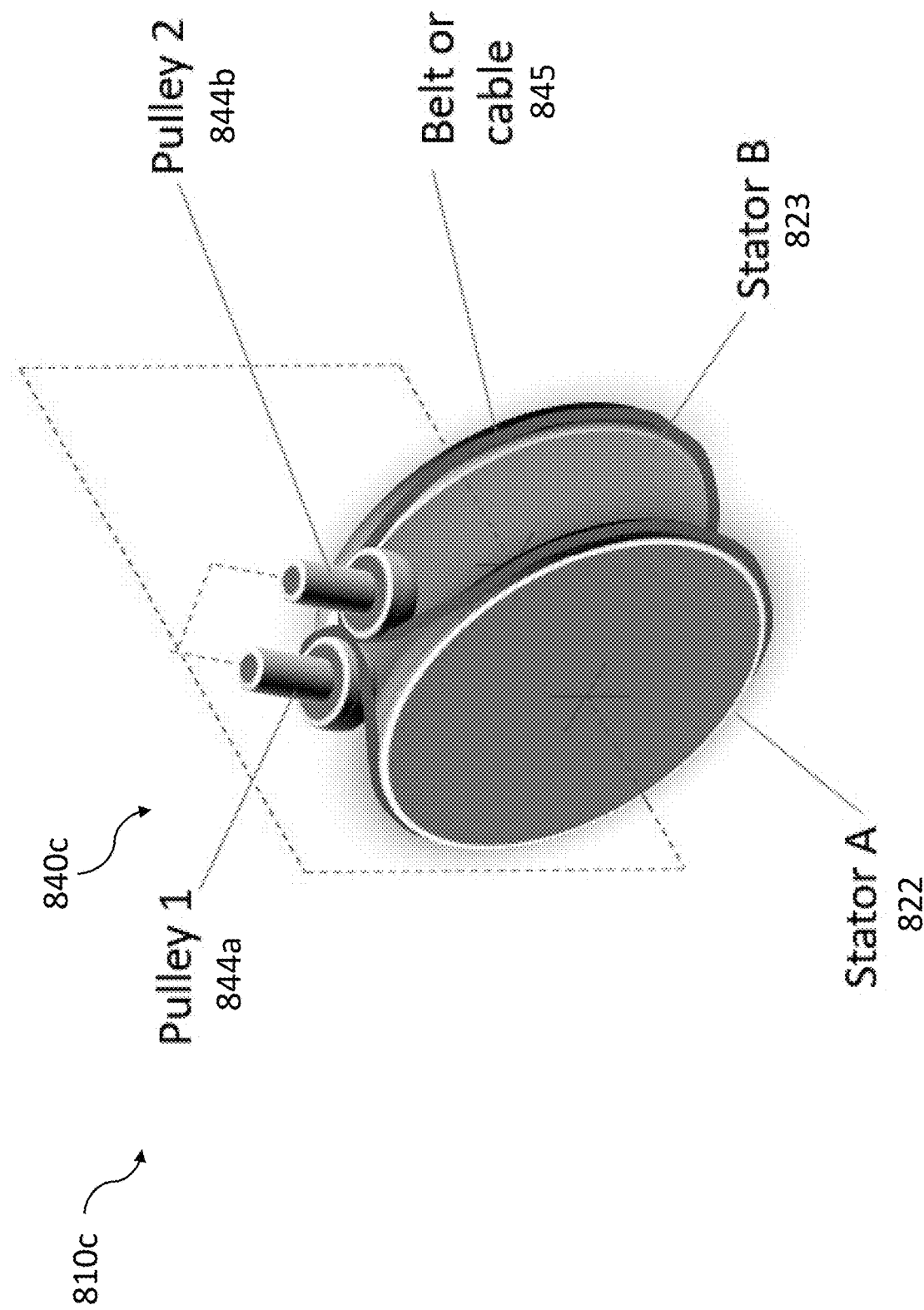
FIG. 8C shows an exemplary actuator with a dual pulley actuated transmission.

FIG. 8C show an exemplary actuator 810c with a dual pulley transmission 840c. As shown, the transmission 840c may include pulleys 844a and 844b that are both used to guide a belt 845. Unlike the belt 843 in the actuator 810b in FIG. 8B, the belt 845 in the actuator 810c is not fixed to the first stator 822 or the second stator 823. Instead, the belt 845 is wrapped in tension around the first stator 822, the second stator 823, and the pulleys 844a and 844b. The actuator 810c, however, operates in a similar manner to the actuator 810b by providing counter-rotating motion between the first stator 822 and the second stator 823. For this design, the length of the belt 845 may be constrained by the size and placement of the first stator 822, the second stator 823, and the pulleys 844a and 844b.

Figure 8D:
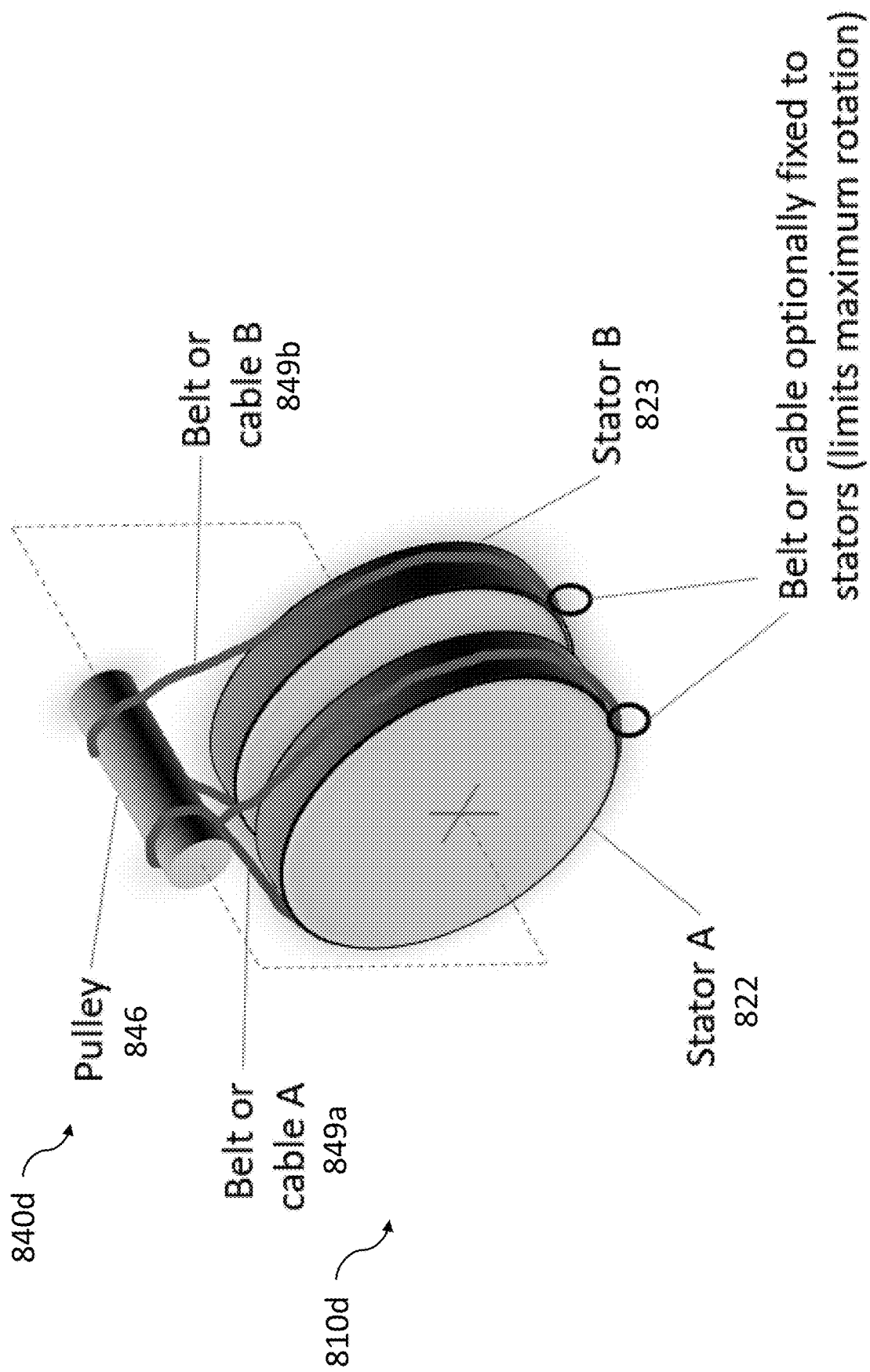
FIG. 8D shows an exemplary actuator with a single pulley, dual belt/cable transmission.

FIG. 8D shows an exemplary actuator 840d with a single-pulley, dual-belt transmission 840d. As shown, the transmission 840d may include a cylindrical pulley 846 that rotates about a rotation axis parallel to the rotation axis of the first stator 822 and the second stator 823. For this design, the transmission 840d includes belt 849a that couples the first stator 822 to the pulley 846 and belt 849b that couples the second stator 823 to the pulley 846. The belt 849a may be twisted to form an additional loop that wraps around the pulley 846 so the transmission 840d provides counter-rotating motion between the first stator 822 and the second stator 823. In some cases, one or both of the belts 849a and 849b may be fixed to their respective stators in order to constrain the range of rotation.

Figures 8E, 8F:
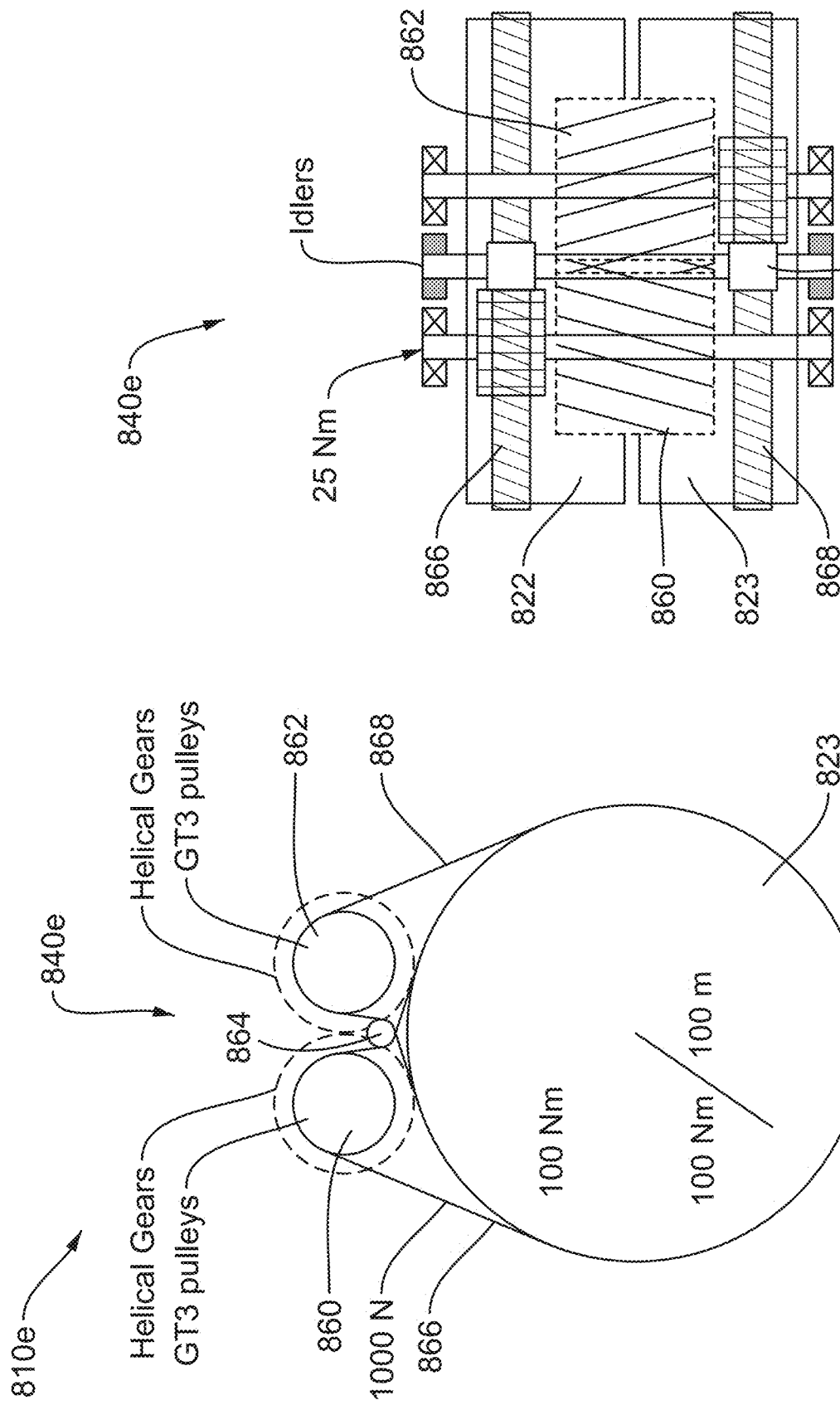
FIG. 8E shows a side view of an exemplary actuator with a dual helical gear transmission.
FIG. 8F shows a top view of the actuator of FIG. 8E.
Figure 10A:
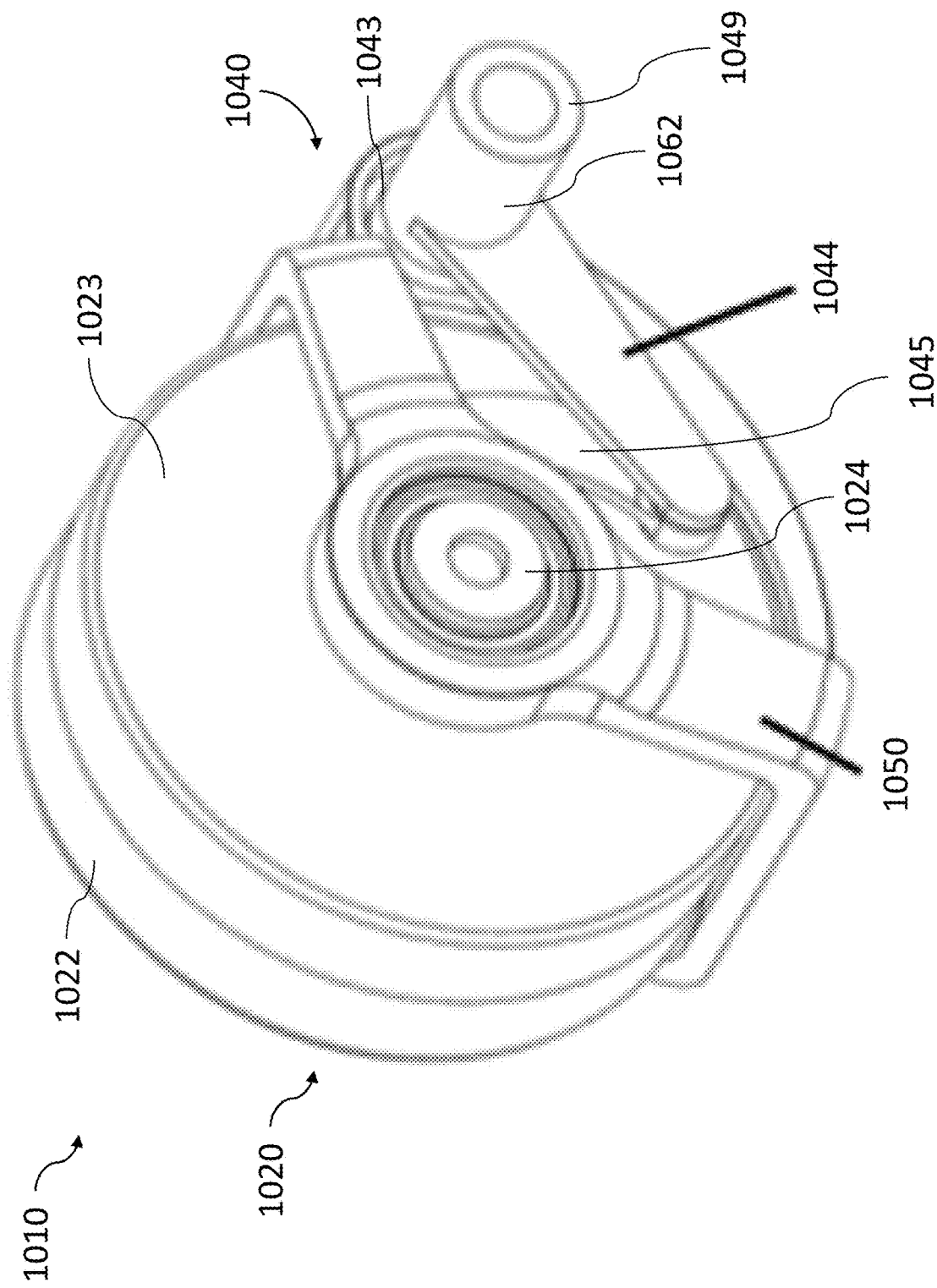
FIG. 10A shows a perspective view of another exemplary actuator with a rocker link and a differential shaft offset from the drive shaft and coaxial with a torsion bar.
Figure 10B:
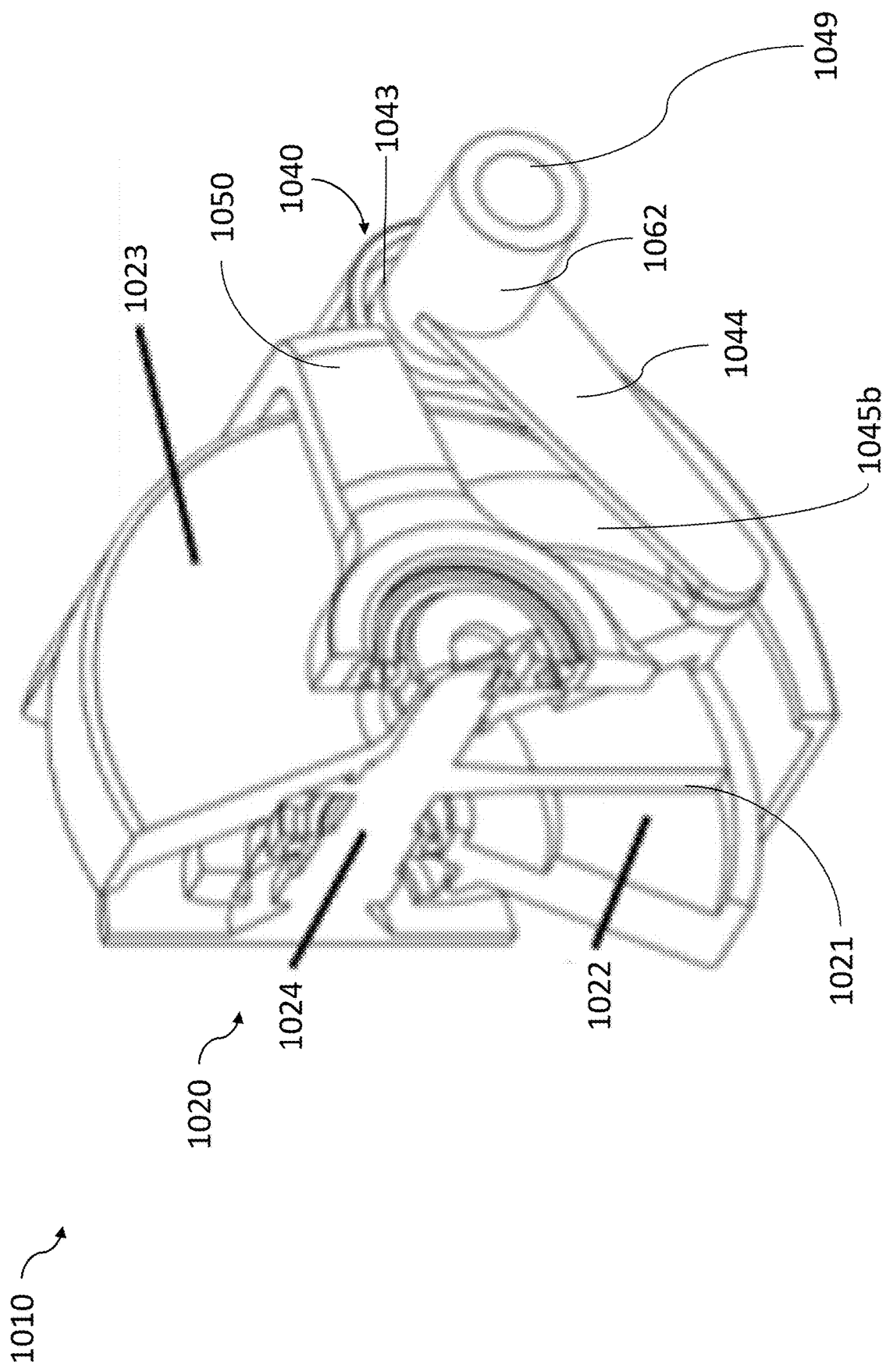
FIG. 10B shows a cross-sectional perspective view of the actuator of FIG. 10A.
Figure 10C:
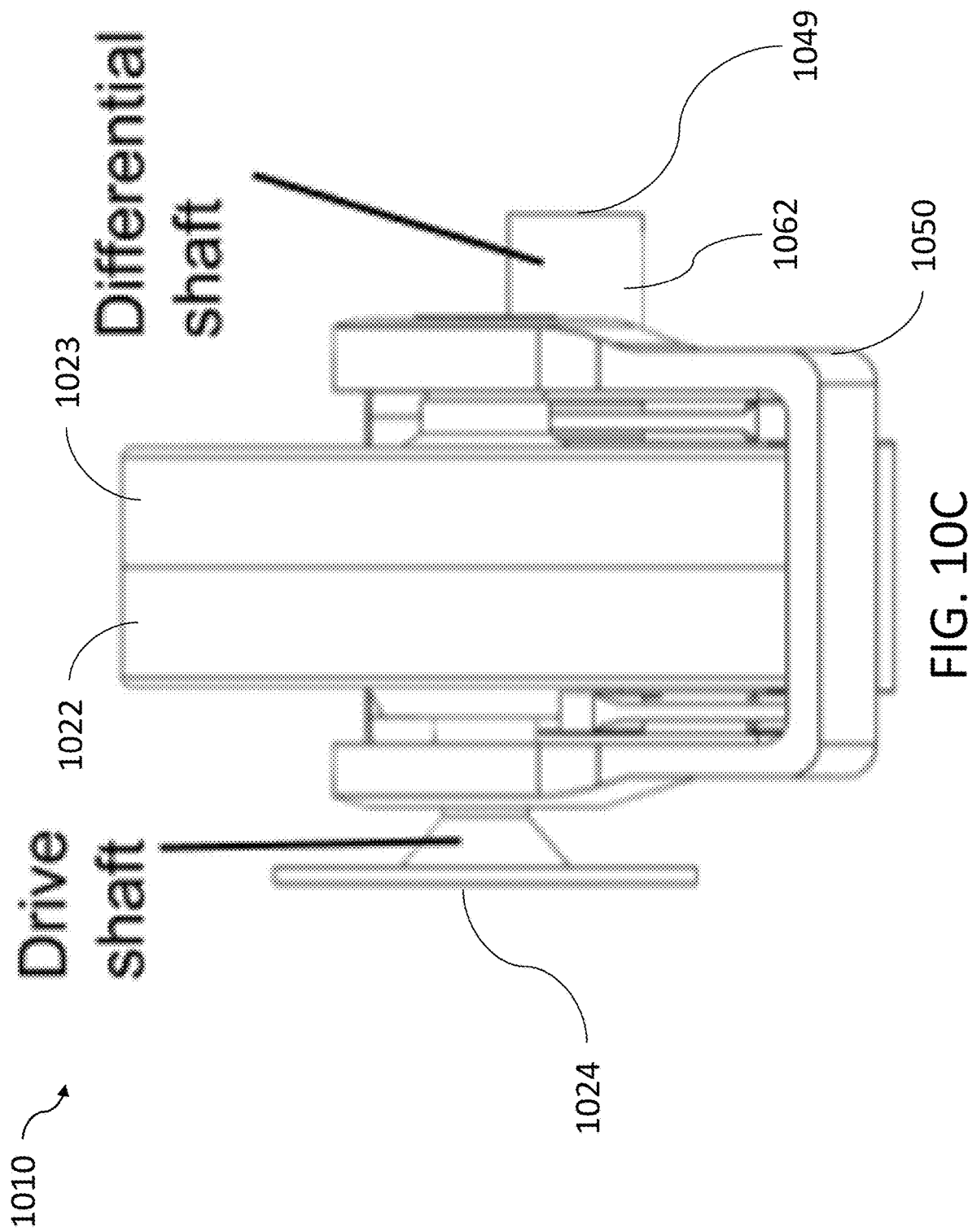
FIG. 10C shows a rearview of the actuator of FIG. 10A.
Figure 10D:
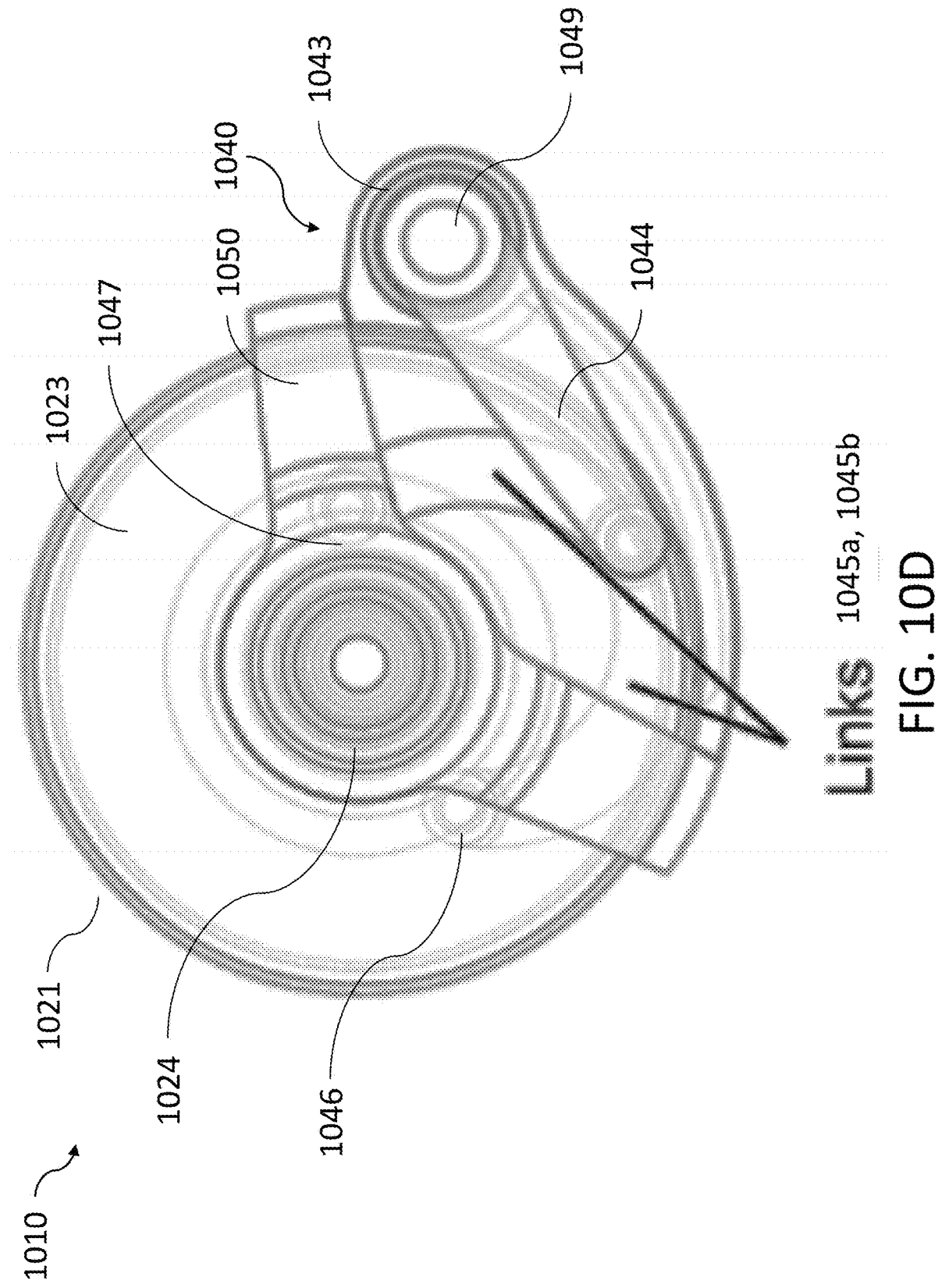
FIG. 10D shows an inboard view of the actuator of FIG. 10A.
Figure 10E:
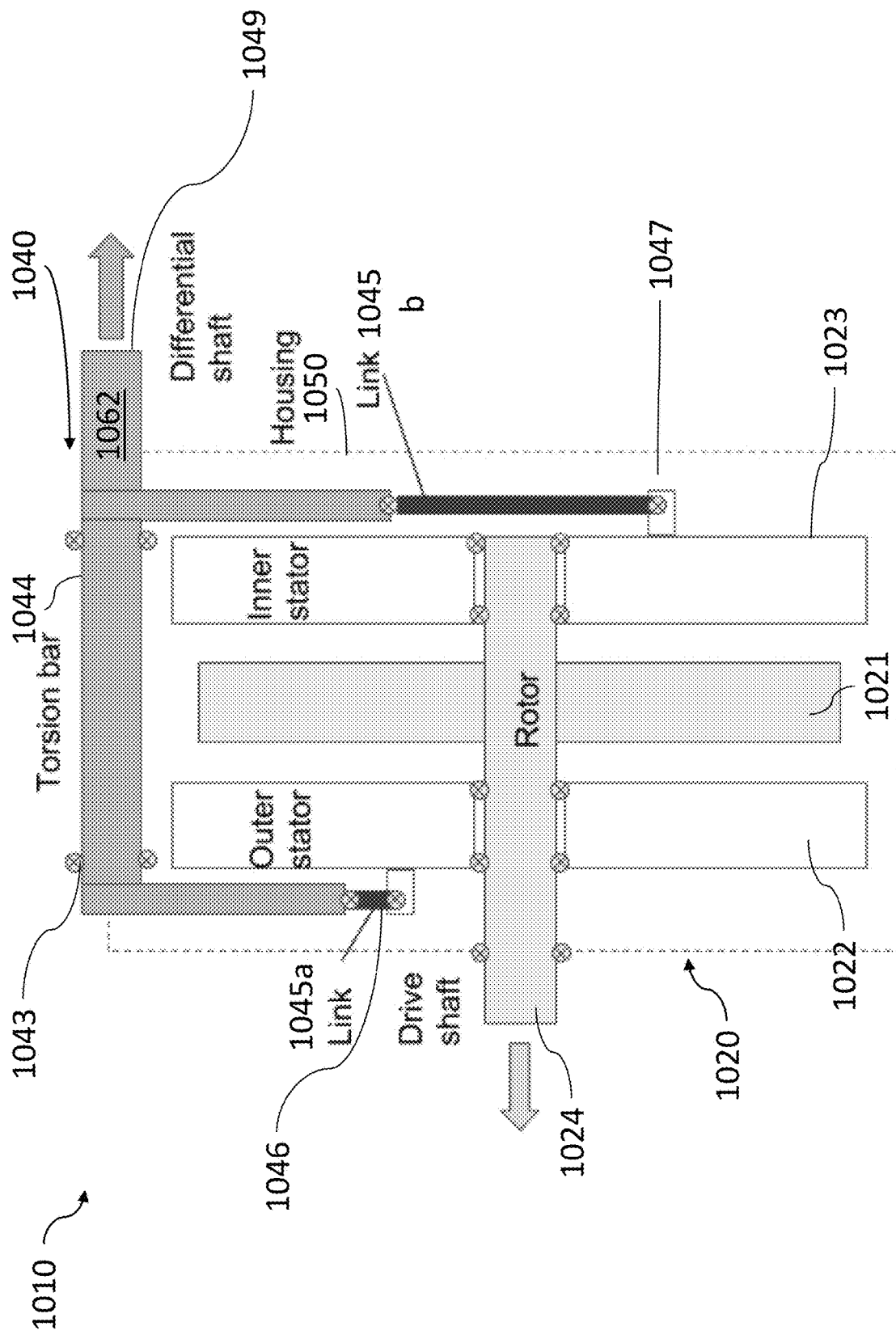
FIG. 10E shows a cross-sectional schematic of the actuator of FIG. 10A.

FIGS. 8E and 8F show several views of an exemplary actuator 810e with a dual helical-gear transmission 840e. As shown, the transmission 840e may include helical gears 860 and 862 that rotate with respect to the support structure 850. The helical gears 860 and 862 may be meshed, thus causing counter-rotating motion between the gears 860 and 862. The first stator 822 may be coupled to the helical gear 860 via a belt 866 that is guided by a pulley mounted to the helical gear 860. Similarly, the second stator 823 may be coupled to the helical gear 862 via a belt 868 guided by a pulley mounted to the helical gear 862. Thus, when the first stator 822 rotates, the belt 866 is pulled along, which produces a tensile force that causes the helical gear 860 to rotate. This, in turn, causes the helical gear 862 and the second stator 823 via the belt 868 to rotate in the opposite direction. The belts 866 and 868 may each be kept in tension via idlers 864. The idlers 864 may be constrained by the support structure 850 to rotate about an axis parallel to the helical gears 860 and 862.

An Exemplary Actuator with a Transmission Coupled to a Chassis

FIG. 9A shows an actuator assembly 900a with a sliding joint transmission 940a where the transmission 940a is directly coupled to the chassis 12. As shown, the actuator assembly 900a includes an actuator 910a with a motor 920, a transmission 940a, and a support structure 950. As before, the motor 920 includes a rotor 921 that mounts to a spindle 924, which defines a rotation axis 13. The spindle 924 may be mechanically coupled to a reference ground 11 (e.g., via a wheel on a road). The motor 920 further includes a first stator 922 and a second stator 923 that each support a torque source (not shown) to apply a torque to the rotor 921. The first stator 922 and second stator 923 may be coaxially constrained to the spindle 924 via one or more bearings. The spindle 924 may be further coupled to the support structure 950. The support structure 950 may be slidably adjustable along a strut 953, which is rigidly coupled to the chassis 12. As before, the actuator assembly 900a may include springs 954a and 954b to provide a restoring force for the actuator 910a.

The transmission 940a may also couple to the first stator 922 and second stator 923 in a similar manner to previous embodiments. The transmission 940a may include a link 945a that couples the first stator 922 at node 946 to the joint housing 942 at node 943 and a link 945b that couples the second stator 923 at node 2204 to the joint housing 942. The links 945a and 945b may be coupled to the stators and the joint housing 942 via pin joints (or ball joints). The transmission 940a in this embodiment is directly coupled to the chassis 12 at node 949 via link 948, which changes the manner in which the reactive torques are transferred in the actuator 910a. For instance, when a reactive torque is applied to the first stator 922, at least a portion of the reactive torque is transferred to the joint housing 942 via the link 945a. This, in turn, causes the joint housing 942 to slide along the support structure 950. However, since the joint housing 942 is directly coupled to the chassis 12, the reactive torque primarily transfers from the transmission 940a to the chassis 12 (rather than being transferred to the second stator 923). A reactive torque applied to the second stator 923 provides similar behavior. Since the second stator 923 does not receive the reacted torque from the first stator 922, the first stator 922 and the second stator 923 may be loaded in a symmetric manner when applying similar reactive torques from respective torque sources.

Nevertheless, the actuator 910a may operator in a similar manner to previous embodiments. The input torques may be represented as a vector-summated torque applied to the rotor 921. The transmission 940a causes counter-rotation between the first stator 922 and the second stator 923, thus the reactive torques may be represented as a differential torque output. The differential torque may produce a force between the transmission 940a and the chassis 12 along the link 948 that causes the actuator 910a to translate along the strut 953. Additionally, the differential torque may produce a reactive force/torque between the support structure 950 of the actuator 910a and the strut 953, which may be used as an additional output (e.g., for anti-dive, anti-squat).

FIG. 9B shows another exemplary actuator assembly 900b where the transmission 940b includes a rocker joint and is directly coupled to the chassis 12. Similar to the actuator 210b, the transmission 940b may include a rocker joint arm 944 that couples to the links 945a and 945b and the node 943 on the support structure 950. Additionally, the rocker joint arm 944 may also be directly coupled to the chassis 12 at node 949 via link 948. The transmission 940b, however, may operate in a similar manner to the actuator 210b and the actuator assembly 900b may transfer torque in a similar manner to the actuator 910a.

FIGS. 10A-10E show several views of an exemplary actuator 1010 with a transmission 1040 having a Panhard link that also provides the differential torque output. The actuator 1010 is kinematically similar to the actuator 910b and thus operates in a similar manner. (Reference numbers with like ending digits are kinematically equivalent unless otherwise noted, e.g., rotor 921 in FIG. 9B is kinematically equivalent to rotor 1021 in FIG. 10E.) As shown, the transmission 1010c includes links 1045a and 1045b coupled to a torsion bar 1044. In this case, the differential shaft 1062 is directly coupled to the torsion bar. Thus, reactive torques applied to the first stator 1022 and the second stator 1023 may be transferred as an output through the torsion bar.

Figure 11A:
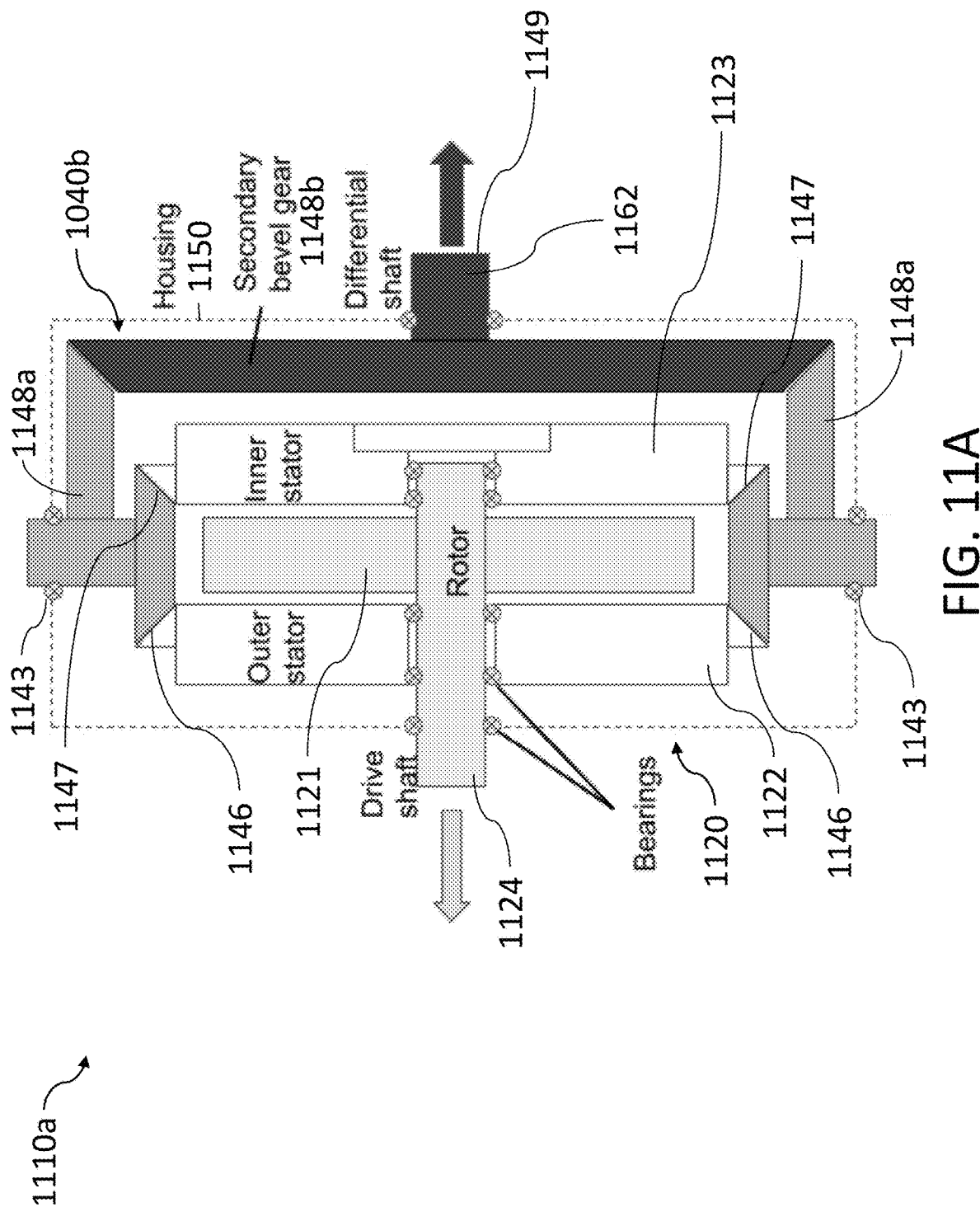
FIG. 11A shows a cross-sectional schematic of an exemplary actuator with a differential shaft mounted to a secondary bevel gear in the transmission.

FIG. 11A shows another exemplary actuator 1110a where the transmission 1140a has a bevel gear mechanism that directly outputs the differential torque. The actuator 1110a is also kinematically similar to the actuator 910b of FIG. 9B and thus operates in a similar manner. (Again, reference numbers with like ending digits are kinematically equivalent unless otherwise noted.) The transmission 1140b includes a bevel gear 1148a that meshes with the first stator 1122 and the second stator 1123 to create a counter rotating motion between the first stator 1122 and second stator 1123. However, in this case, the bevel gear 1148a includes a supplemental gear that meshes to a secondary bevel gear 1148b supporting the differential shaft 2350. In this manner, rotation of the first stator 1122 and/or the second stator 1123 causes the bevel gear 1148a to rotate, which in turn causes the secondary bevel gear 1148b to rotate resulting in the output of the differential torque at node 1149.

Figure 11B:
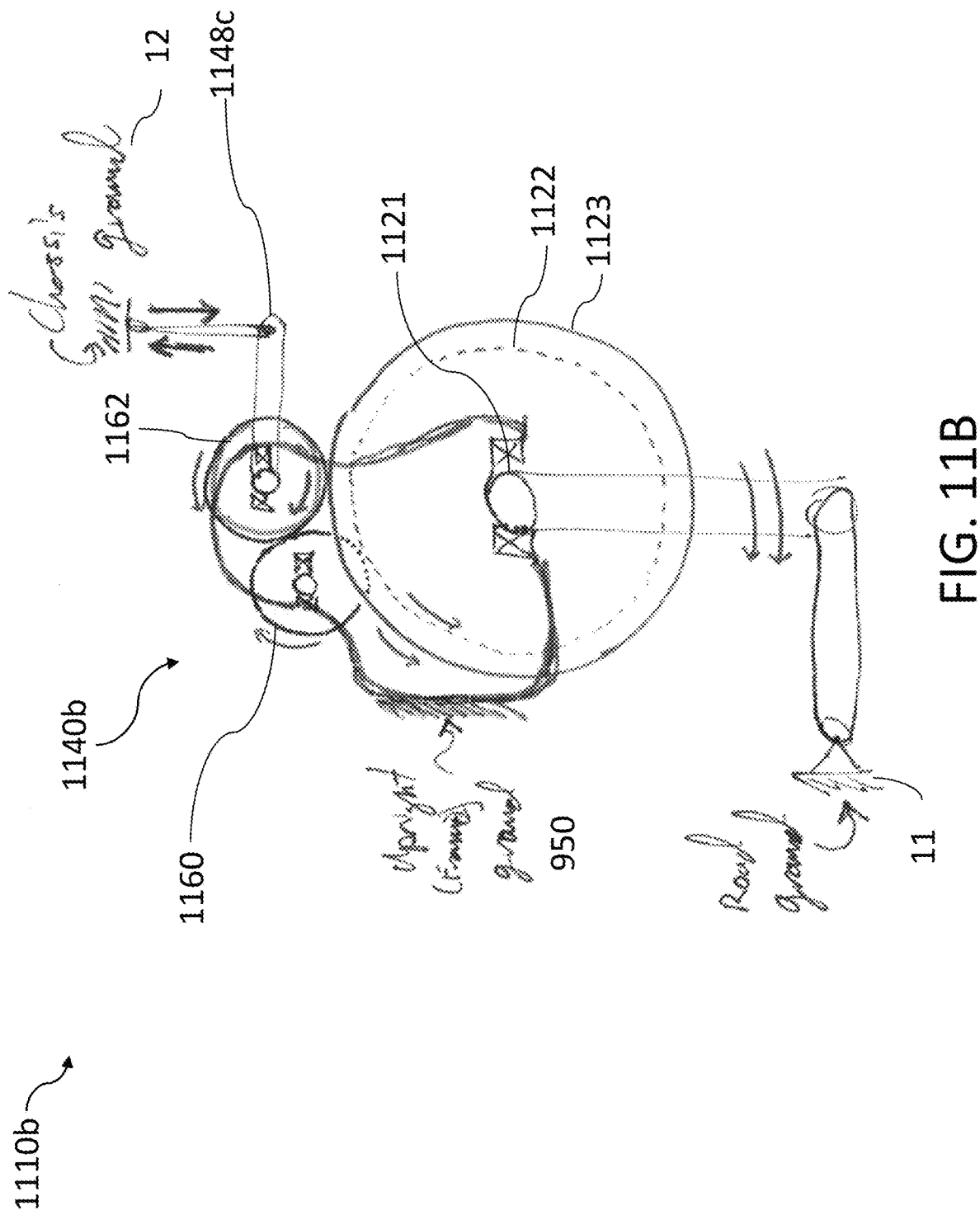
FIG. 11B shows a side view of an exemplary actuator with a dual gear transmission directly coupled to the chassis.

FIG. 11B shows another exemplary actuator 1110b with a dual gear transmission 1140b coupled to the chassis 12. As shown, the transmission 1140b may include a first gear 1160 meshed with the first stator 1122 and a second gear 1162 meshed with the second stator 1123. The first gear 1160 and second gear 1162 may also be meshed together, thus producing counter rotating motion between the first stator 1122 and the second stator 1123. The first gear 1160 and second gear 1162 may be supported by the support structure 1150. Additionally, the second gear 1162 may be coupled to the chassis 12 via a linkage 1148c. Thus, reactive torques transferred to the first gear 1160 and/or second gear 1162 may then be transferred to the chassis 12 via the linkage 1148c in order to produce an actuation force that translates the actuator 1110b with respect to the chassis 12. The actuator 1110b is also kinematically similar to the actuator 910b in FIG. 9B.

FIGS. 12A-12C show several views of an exemplary actuator assembly 1200 that outputs a translational movement and/or force as opposed to a differential torque. In this case, the actuator 1210 is kinematically equivalent to the actuator 910a in FIG. 9A. The actuator 1210 may include a transmission 1240 that constrains the first stator 1222 and the second stator 1223 to counter rotation. The transmission 1240 may include a sliding joint 1274 that couples to the chassis 12 via linkage 1272. The sliding joint 1274 may be slidably adjustable along a strut 1270 that is coupled to the support structure 1250. The sliding joint 1274 may also be mounted onto an arm 1276 this is slidably adjustable with respect to the support structure 1250 along an axis substantially orthogonal to the axis along which the sliding joint 1274 moves relative to the strut 1270. In this manner, the strut 1270 and the arm 1276 constrain the actuator 1210 to translate (as opposed to rotate) with respect to the chassis 12.

The transmissions depicted in FIGS. 8A-8F may be readily incorporated into an actuator where the transmission is directly coupled to the chassis 12. This may be accomplished, in part, by adding a differential shaft to one of the components in the transmission. For example, a differential shaft may be disposed on one of the pulleys in the pulley-based transmissions shown in FIGS. 8A-8F, which in turn may be coupled to the chassis 12 directly.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An actuator for a vehicle, the actuator comprising:
   a support structure configured to be slidably coupled to a strut rigidly coupled to a chassis of the vehicle;
   a transmission coupled to the support structure;
   a motor coupled to the support structure and the transmission, the motor comprising:
      a spindle defining a rotation axis;
      a rotor to rotate about the rotation axis;
      a first stator, rotatably coupled to the spindle and concentric with the rotation axis, to apply a first torque to the rotor, the first torque causing a first reactive torque to be applied to the first stator; and
      a second stator, rotatably coupled to the spindle and concentric with the rotation axis, to apply a second torque to the rotor, the second torque causing a second reactive torque to be applied to the second stator; and
   a link rotatably coupled directly to the second stator and configured to be coupled directly to the chassis of the vehicle,
   wherein the first and second reactive torques produce a surplus force, the surplus force being applied as separate force components at A) the link and B) the strut via the support structure.

2. The actuator of claim 1, wherein the support structure is configured to reflect a torque proportional to a vector sum of the first torque and the second torque.

3. The actuator of claim 1, wherein the support structure and the motor are allowed to travel along a translation axis and the transmission comprises:
   a first link connecting the first stator to the transmission at a first point offset from the translation axis; and
   a second link connecting the second stator to the transmission at a second point offset from the translation axis.

4. The actuator of claim 3, wherein the first point and the second point are disposed asymmetrically about the rotation axis to provide a mechanical advantage.

5. The actuator of claim 3, wherein the transmission comprises a torsion bar, coupled to the first link and to the second link, to twist about an axis parallel to the rotation axis.

6. The actuator of claim 5, further comprising:
a differential output, coaxial with the rotation axis, to output a torque proportional to a difference between the first torque and the second torque.

7. The actuator of claim 5, further comprising:
a differential output, parallel to the rotation axis, to output a torque proportional to a difference between the first torque and the second torque.

8. The actuator of claim 1, wherein the transmission comprises:
at least one bevel gear, meshing with at least one of the first stator or the second stator, to cause the first stator to rotate in response to rotation of the second stator.

9. The actuator of claim 8, wherein the at least one bevel gear comprises a first bevel gear and a second bevel gear, each meshing with the first stator and the second stator, to cause the first stator to counter-rotate in response to rotation of the second stator.

10. The actuator of claim 8, wherein the at least one bevel gear comprises a first bevel gear meshing with the first stator and a second bevel gear meshing with the second stator and having a different radius than the first bevel gear to provide a mechanical advantage.

11. The actuator of claim 1, wherein the transmission comprises:
at least one planetary gear, meshing with at least one of the first stator or the second stator, to cause the first stator to rotate in response to rotation of the second stator.

12. The actuator of claim 1, wherein the motor is at least one of an axial flux motor or a radial flux motor.

13. The actuator of claim 1, wherein the second stator transfers at least a portion of the second reactive torque to the strut via the transmission.

14. An actuator assembly for a vehicle, the actuator assembly comprising:
an axial flux motor comprising a support structure, a spindle defining a first rotation axis, a rotor fixed to the spindle, a first stator concentric with the first rotation axis, and a second stator concentric with the first rotation axis;
a suspension rigidly connected to the support structure and compressibly coupled to a chassis of the vehicle;
a torsion bar rotatably coupled to the suspension and rotatably coupled to the first stator and the second stator, the torsion bar being rotatable about a second rotation axis offset from the first rotation axis; and
a tension-compression member rotatably coupled to the second stator and rotatably coupled to the chassis.

15. A method of actuating at least one of A) a rotor configured to rotate about a rotation axis or B) a support structure configured to slidably move with respect to a chassis of a vehicle, the method comprising:
applying a first torque to the rotor;
while applying the first torque, applying a second torque to the rotor;
in response to applying the first torque, applying a first reactive torque to a first stator configured to rotate about the rotation axis;
in response to applying the second torque, applying a second reactive torque to a second stator configured to rotate about the rotation axis, the second stator being coupled to the first stator via a transmission;
transferring at least a portion of the first reactive torque from the first stator to the support structure via the transmission; and
transferring at least a portion of the second reactive torque from the second stator directly to the chassis.

16. The method of claim 15, further comprising:
reflecting a torque proportional to a vector sum of the first torque and the second torque using the support structure.

17. The method of claim 15, wherein:
actuating the support structure causes the support structure to travel along a translation axis, and
transferring at least a portion of the first reactive torque comprises transferring the at least a portion of the first reactive torque from the first stator to a first link, the first link connecting the first stator to the transmission at a first point offset from the translation axis.

18. The method of claim 17, wherein transferring the at least a portion of the second reactive torque comprises transferring the at least a portion of the second reactive torque from the second stator to a second link, the second link connecting the second stator to the transmission at a second point offset from the translation axis.

19. The method of claim 18, wherein the first point and the second point are disposed asymmetrically about the rotation axis, and further comprising:
generating a mechanical advantage based on the first and second reactive torques.

20. The actuator assembly of claim 14, wherein the axial flux motor is allowed to travel along a translation axis and the actuator assembly further comprises:
a first link coupled to the torsion bar and the first stator at a first point offset from the translation axis; and
a second link coupled to the torsion bar and the second stator at a second point offset from the translation axis.

* * * * *